US012750146B2

(12) United States Patent
Hirzallah et al.

(10) Patent No.: US 12,750,146 B2
(45) Date of Patent: Sep. 29, 2026

(54) TRAINING POSITIONING MODELS FOR DIFFERENT DOWNLINK TRANSMIT POWER CONFIGURATIONS

(71) Applicant: QUALCOMM Incorporated, San Diego, CA (US)

(72) Inventors: Mohammed Ali Mohammed Hirzallah, San Diego, CA (US); Marwen Zorgui, San Diego, CA (US); Srinivas Yerramalli, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 463 days.

(21) Appl. No.: 18/334,267

(22) Filed: Jun. 13, 2023

(65) Prior Publication Data

US 2024/0421927 A1 Dec. 19, 2024

(51) Int. Cl.

*H04B 17/391* (2015.01)
*H04B 17/309* (2015.01)
*H04W 64/00* (2009.01)

(52) U.S. Cl.

CPC ....... *H04B 17/3912* (2015.01); *H04B 17/309* (2015.01); *H04W 64/00* (2013.01)

(58) Field of Classification Search

None

See application file for complete search history.

(56) References Cited

U.S. PATENT DOCUMENTS

2024/0154752 A1* 5/2024 Säily .................... G01S 5/0236
2024/0196359 A1* 6/2024 Lyazidi .................. H04W 8/12
2024/0422726 A1* 12/2024 Jia ........................ H04W 12/02

FOREIGN PATENT DOCUMENTS

WO WO-2021056595 A1 * 4/2021 .............. H04L 1/00
WO 2022155244 A2 7/2022

OTHER PUBLICATIONS

International Search Report and Written Opinion—PCT/US2024/031673—ISA/EPO—Sep. 20, 2024.

* cited by examiner

*Primary Examiner* — Adolf Dsouza
(74) *Attorney, Agent, or Firm* — Procopio, Cory, Hargreaves & Savitch LLP

(57) ABSTRACT

A wireless device may receive a configuration for a measurement of a set of reference signals (RSs). The set of RSs may include a first subset of RSs and a second subset of RSs. The wireless device may receive the set of RSs from a network node. The first subset of RSs may be associated with a first transmission (Tx) power setting and the second subset of RSs may be associated with a second Tx power setting. The first Tx power setting may be different from the second Tx power setting. The wireless device may measure the set of RSs. The wireless device may output the measured set of RSs for a training of a positioning model. The wireless device may include a user equipment (UE) or a positioning reference unit (PRU).

30 Claims, 12 Drawing Sheets

TRAINING POSITIONING MODELS FOR DIFFERENT DOWNLINK TRANSMIT POWER CONFIGURATIONS

TECHNICAL FIELD

The present disclosure relates generally to communication systems, and more particularly, to a wireless positioning system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a wireless device. The wireless device may include a user equipment (UE) or a positioning reference unit (PRU). The apparatus may receive a configuration for a measurement of a set of reference signals (RSS). The set of RSs may include a first subset of RSs and a second subset of RSs. The apparatus may receive the set of RSs from a network node. The first subset of RSs may be associated with a first transmission (Tx) power setting and the second subset of RSs may be associated with a second Tx power setting. The first Tx power setting may be different from the second Tx power setting. The apparatus may measure the set of RSs. The apparatus may output the measured set of RSs for a training of a positioning model.

In an aspect of the disclosure, a method, a computer-readable medium, and an apparatus are provided. The apparatus may include a network node. The network node may include a transmission reception point (TRP) or a base station. The apparatus may receive a configuration for a transmission of a set of RSs associated with a plurality of Tx power settings. The set of RSs may include a first subset of RSs and a second subset of RSs. The apparatus may transmit the first subset of RSs using a first Tx power setting of the plurality of Tx power settings. The apparatus may transmit the second subset of RSs using a second Tx power setting of the plurality of Tx power settings.

In an aspect of the disclosure, a method, a computer-readable medium, and an apparatus are provided. The apparatus may include a network entity. The network entity may include a set of location servers, or a location management function (LMF). The apparatus may transmit a first configuration for transmitting a set of RSs to a network node. The set of RSs may include a first subset of RSs and a second subset of RSs. The first subset of RSs may be associated with a first Tx power setting and the second subset of RSs may be associated with a second Tx power setting. The first Tx power setting may be different from the second Tx power setting. The apparatus may transmit, for a wireless device, a second configuration for a measurement of the set of RSs.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
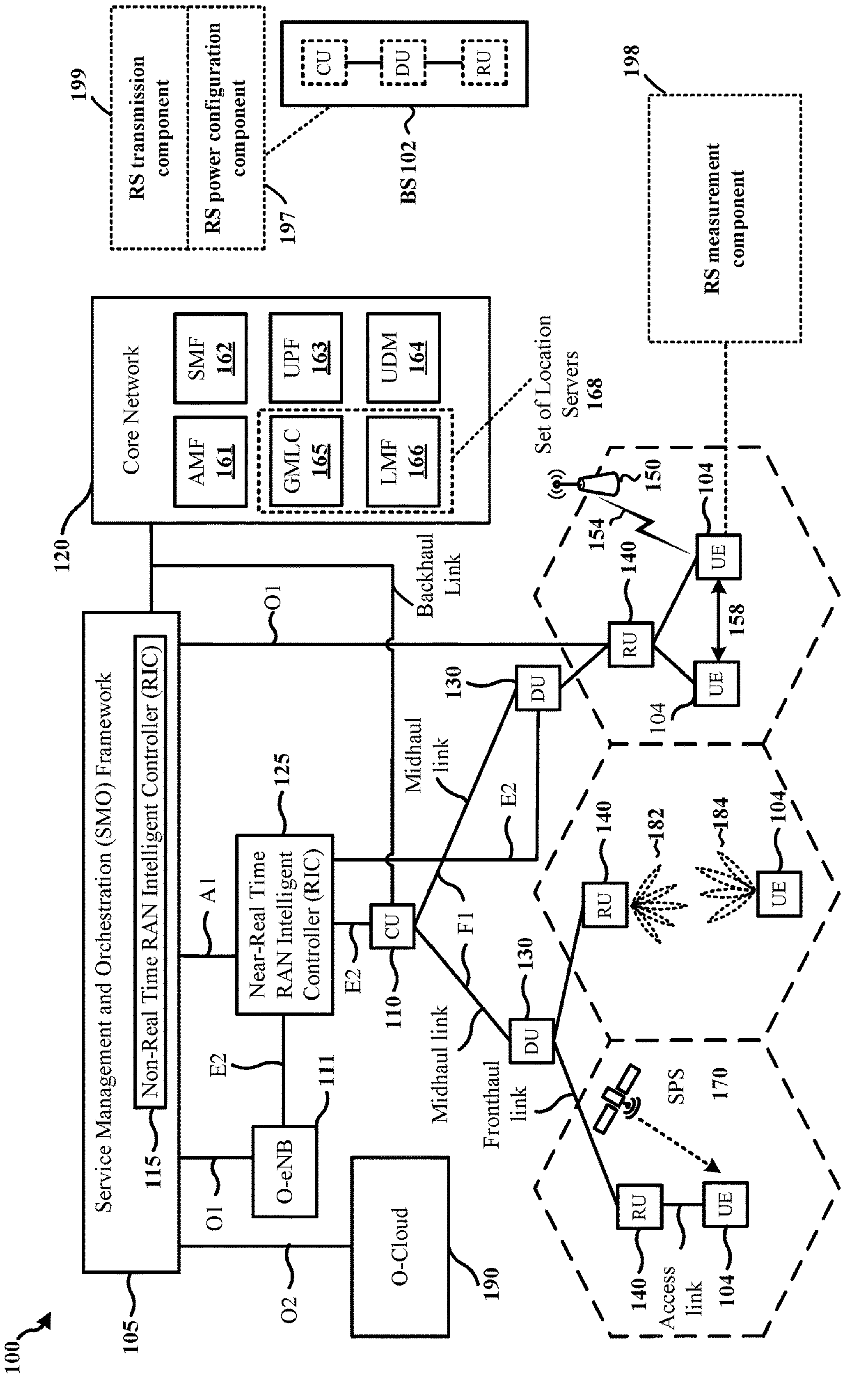
FIG. 1 is a diagram illustrating an example of a wireless communications system and an access network.

The following description is directed to examples for the purposes of describing innovative aspects of this disclosure. However, a person having ordinary skill in the art may recognize that the teachings herein may be applied in a multitude of ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples may be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also may be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to performing positioning on wireless devices. Some aspects more specifically relate to using a positioning model, such as an artificial intelligence (AI)/machine learning (ML) (AI/ML or AIML) positioning model, to calculate a location of a wireless device using RF signals. In some examples, a wireless device, such as a user equipment (UE) or a positioning reference unit (PRU), may receive a configuration for a measurement of a set of reference signals (RSs). The set of RSs may include a first subset of RSs and a second subset of RSs. The wireless device may receive the set of RSs from a network node. The first subset of RSs may be associated with a first transmission (Tx) power setting and the second subset of RSs may be associated with a second Tx power setting. The first Tx power setting may be different from the second Tx power setting. The wireless device may measure the set of RSs. The wireless device may output the measured set of RSs for a training of a positioning model.

In another example, a network node, such as a transmission reception point (TRP) or a base station, may receive a configuration for a transmission of a set of RSs associated with a plurality of Tx power settings. The set of RSs may include a first subset of RSs and a second subset of RSs. The network node may transmit the first subset of RSs using a first Tx power setting of the plurality of Tx power settings. The network node may transmit the second subset of RSs using a second Tx power setting of the plurality of Tx power settings.

In another example, a network entity, such as a set of location servers or a location management function (LMF), may transmit a first configuration for transmitting a set of RSs to a network node. The set of RSs may include a first subset of RSs and a second subset of RSs. The first subset of RSs may be associated with a first Tx power setting and the second subset of RSs may be associated with a second Tx power setting. The first Tx power setting may be different from the second Tx power setting. The network entity may transmit, for a wireless device, a second configuration for a measurement of the set of RSs.

In some aspects, network operators may assign different downlink (DL) transmission (Tx) powers for different cells. In other words, a network node may transmit one DL reference signal (DL-RS) using a first Tx power setting during a first time period and may transmit a second DL-RS using a second Tx power setting during a second time period. Positioning models may be trained on DL-RS having a first Tx power setting, but may be used in environments where a DL-RS is transmitted using a second Tx power setting. As a result, variation of Tx power settings in a network environment may degrade positioning performance of trained positioning models. In some aspects, a positioning model may be trained with DL-based measurements of different Tx power settings. A network entity, such as an LMF, may configure a network node, such as a next generation (NG) radio access network (NG-RAN) node to run redundant RS transmissions (e.g., positioning reference signals (PRSs), synchronization signal blocks (SSBs), channel state information (CSI) reference signals (CSI-RSs)) with different Tx power settings to enable a data collection entity (e.g., UE, PRU) to mimic scenarios of different RS Tx power settings. In some aspects, a wireless device measuring DL-RSs may request a network entity to configure different Tx power settings for DL-RS resources for data training data collection. In some aspects, a network entity may configure a target wireless device to collect measurements corresponding to DL-RS transmissions of different Tx power settings. In some aspects, a Tx power setting may have different configurations when mapped to an RS resource. For example, a single Tx power value may be used to configure an entire RS resource. In another example, a set of Tx power values may be mapped to resource blocks (RBs) and/or resource elements (REs) within a considered RS. In some aspects, a configuration messages between a network node and a network entity may be exchanged as new radio (NR) positioning protocol (NRPP) messages. For example, they may be exchanged as part of an NRPP annex (NRPPa) protocol. In other aspects, a new procedure may be used to exchange configuration messages between the network node and the network entity. In some aspects, a configuration messages between a target wireless device and a network entity may be exchanged as long-term evolution (LTE) positioning protocol (LPP) messages. For example, they may be exchanged as part of an LPP annex (LPPa) protocol. In other aspects, a new procedure may be used to exchange configuration messages between the target wireless device and the network entity. In some aspects, a network node may indicate its capability to a network node regarding different Tx power settings—for example number and kind of power settings. In some aspects, a target wireless device may indicate to a network entity its capability to consider different power settings—for example number of realizations, measurement gap (MG) conditions.

Particular aspects of the subject matter described in this disclosure can be implemented to realize one or more of the following potential advantages. In some examples, by configuring a data collection entity to collect DL-RS measurements using different Tx power settings, the described techniques can be used to improve the robustness of a positioning model trained using such measurements to consider Tx power heterogeneity of DL-based measurements.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHZ-52.6 GHZ). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a wireless device, such as the UE 104 or a positioning reference unit (PRU), may have an RS measurement component 198 that may be configured to receive a configuration for a measurement of a set of RSs. The set of RSs may include a first subset of RSs and a second subset of RSs. The RS measurement component 198 may be configured to receive the set of RSs from a network node. The first subset of RSs may be associated with a first Tx power setting and the second subset of RSs may be associated with a second Tx power setting. The first Tx power setting may be different from the second Tx power setting. The RS measurement component 198 may be configured to measure the set of RSs. The RS measurement component 198 may be configured to output the measured set of RSs for a training of a positioning model. In certain aspects, the base station 102 may have an RS transmission component 199 that may be configured to receive a configuration for a transmission of a set of RSs associated with a plurality of Tx power settings. The set of RSs may include a first subset of RSs and a second subset of RSs. The RS transmission component 199 may be configured to transmit the first subset of RSs using a first Tx power setting of the plurality of Tx power settings. The RS transmission component 199 may be configured to transmit the first subset of RSs using a first Tx power setting of the plurality of Tx power settings. In certain aspects, the base station 102, such as the core network 120, a set of location servers 168, or the LMF 166, may have an RS power configuration component 197 configured to transmit a first configuration for a transmission of a set of RSs to a network node. The set of RSs may include a first subset of RSs and a second subset of RSs. The first subset of RSs may be associated with a first Tx power setting and the second subset of RSs may be associated with a second Tx power setting. The first Tx power setting may be different from the second Tx power setting. The RS power configuration component 197 may be configured to transmit, for a wireless device, a second configuration for a measurement of the set of RSs. In other words, the RS power configuration component 197 may configure the RS transmission component 199 to transmit sets of RSs at the RS measurement component 198 at different power levels. The RS measurement component 198 may then receive the sets of RSs at different power levels, and use those measurements to train a positioning model using RSs that are transmitted at different power levels. The RS measurement component 198 may train the positioning model locally at a wireless device, or may transmit the measurements to a training entity for a training of the positioning model.

Figures 2A, 2B, 2C, 2D:
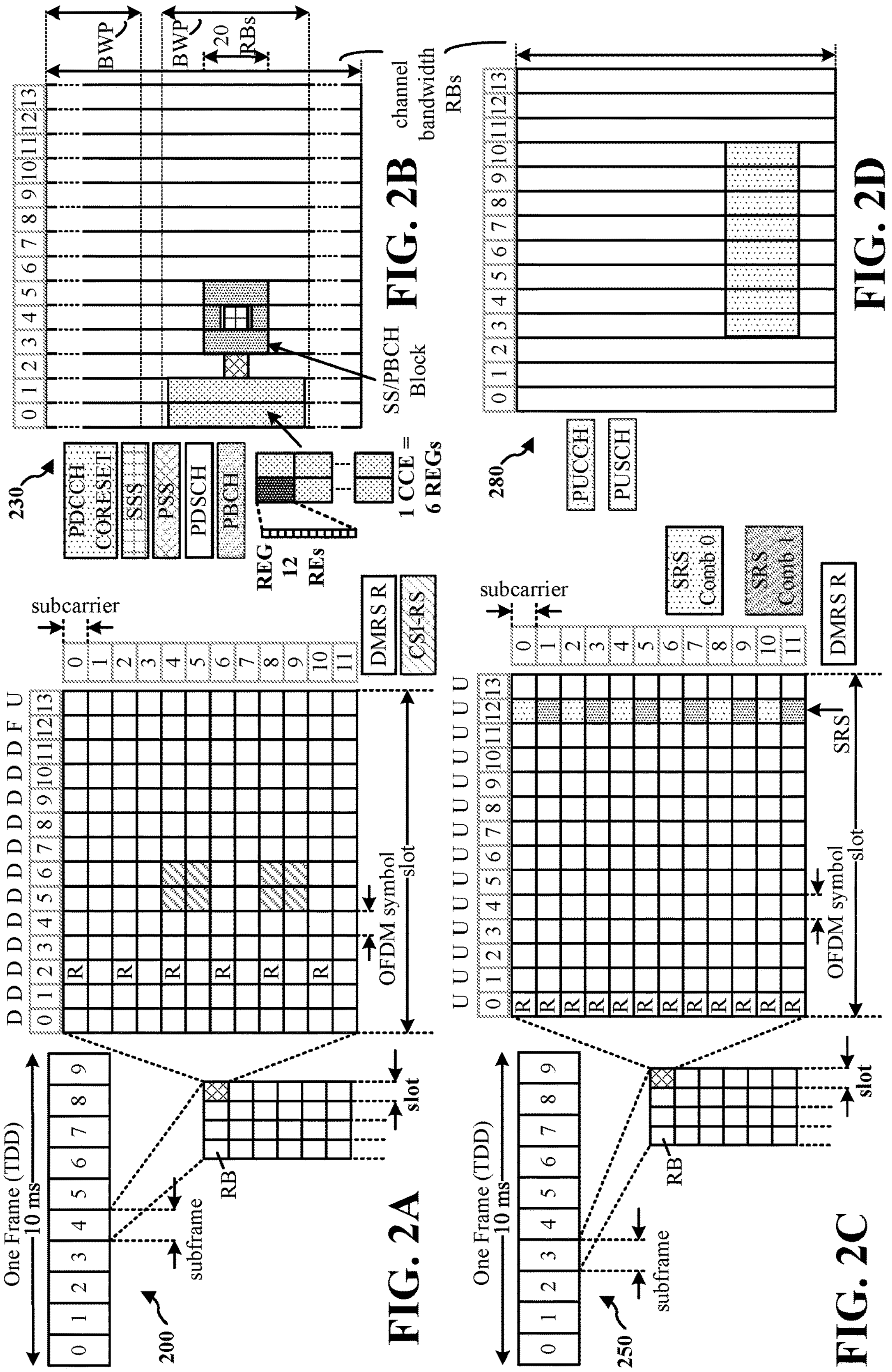
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and 24 slots/subframe. The subcarrier spacing may be equal to $2^{\mu}*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
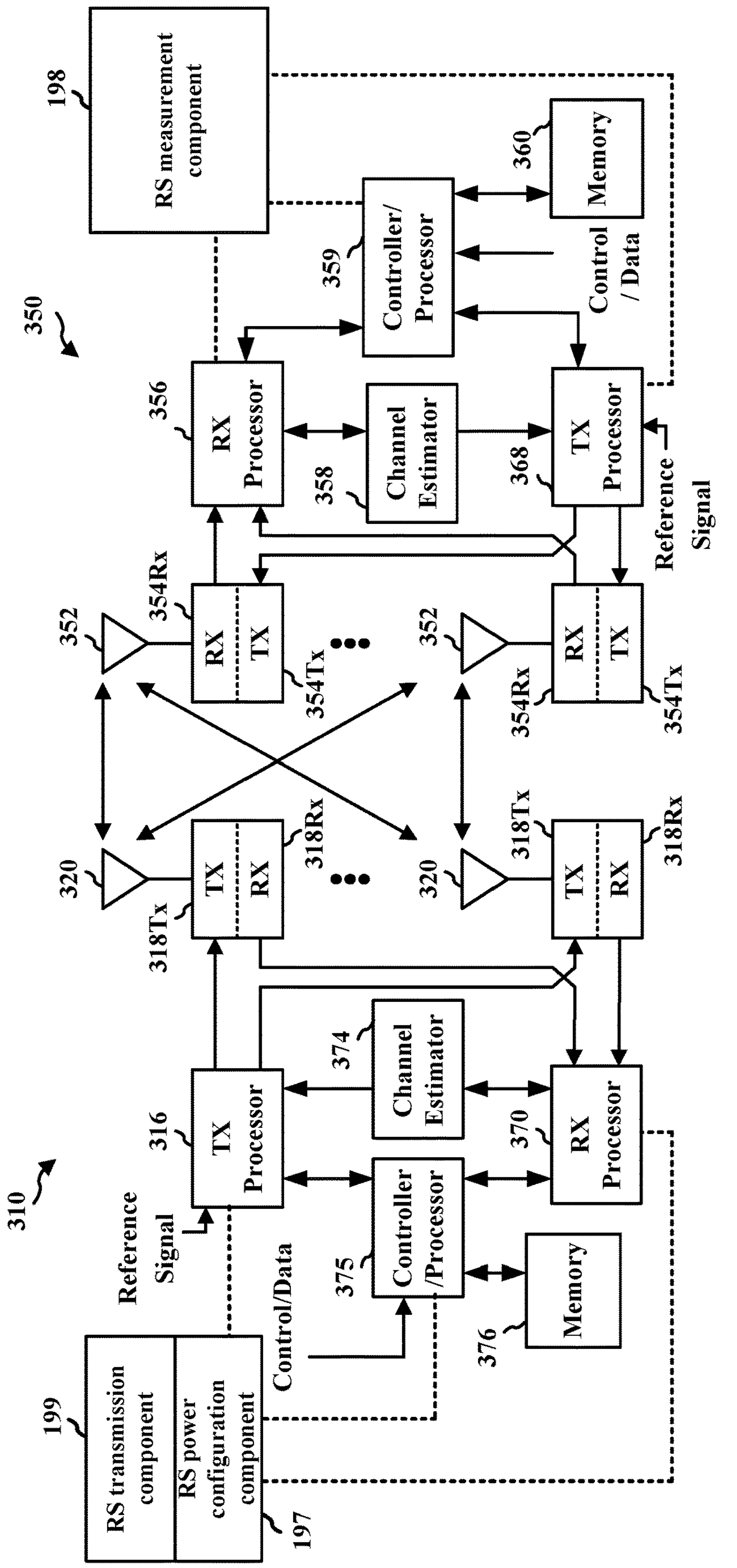
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the RS measurement component 198 of FIG. 1.

At least one of the TX processor 316, the RX processor 370, and the controller/processor 375 may be configured to perform aspects in connection with the RS transmission component 199 of FIG. 1.

At least one of the TX processor 316, the RX processor 370, and the controller/processor 375 may be configured to perform aspects in connection with the RS power configuration component 197 of FIG. 1.

Figure 4:
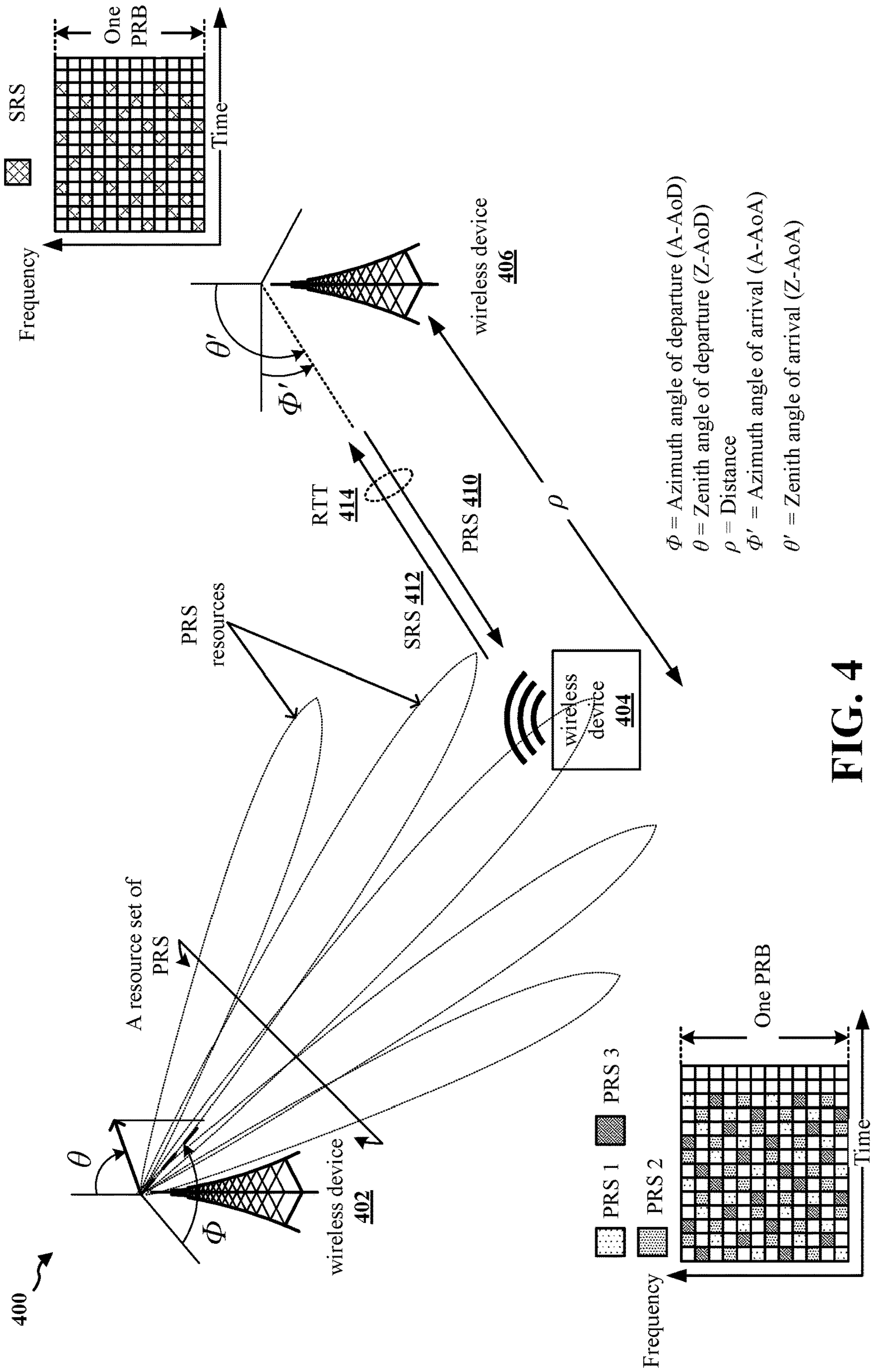
FIG. 4 is a diagram illustrating an example of positioning based on positioning signal measurements.

FIG. 4 is a diagram 400 illustrating an example of positioning based on reference signal measurements. The wireless device 402 may be a UE, a base station, or a positioning reference unit (PRU). The wireless device 404 may be a UE, a base station, or a PRU. The wireless device 406 may be a UE, a base station, or a PRU. The wireless device 402 may be referred to as a positioning target wireless device, whose location may be calculated based on measurements of one or more reference signals. The wireless device 404 and the wireless device 406 may be referred to as positioning neighbor wireless devices, whose locations may be known, which may be used to calculate the location of the wireless device 402. The wireless device 404 may transmit SRS 412 at time $T_{SRS\_TX}$ to the wireless device 406. The wireless device 404 may receive positioning reference signals (PRS) 410 at time $T_{PRS\_RX}$ from the wireless device 406. The SRS 412 may be an UL-SRS. The PRS 410 may be a DL-PRS. In some aspects, the wireless device 402 may be a TRP and the wireless device 406 may be a TRP, which may be both configured to transmit DL-PRS to the wireless device 404. The wireless device 404 may be a UE configured to transmit UL-SRS to the wireless device 402 and the wireless device 406.

The wireless device 406 may receive the SRS 412 at time $T_{SRS\_RX}$ from the wireless device 404 and transmit the PRS 410 at time $T_{PRS\_TX}$ to the wireless device 404. The wireless device 404 may receive the PRS 410 before transmitting the SRS 412. The wireless device 404 may transmit the SRS 412 before receiving the PRS 410. The wireless device 404 may transmit the SRS 412 in response to receiving the PRS 410. The wireless device 406 may transmit the PRS 410 in response to receiving the SRS 412. A positioning server (e.g., location server(s) 168), the wireless device 404, or the wireless device 406 may determine the round-trip-time (RTT) 414 based on $\|T_{SRS\_RX}-T_{PRS\_TX}|-|T_{SRS\_TX}-T_{PRS\_RX}\|$. Multi-RTT positioning may make use of the Rx-Tx time difference measurements (i.e., $|T_{SRS\_TX}-T_{PRS\_RX}|$) and PRS reference signal received power (RSRP) (PRS-RSRP) of PRS signals received from multiple wireless devices, such as the wireless device 402 and the wireless device 406, which are measured by the wireless device 404, and the measured Rx-Tx time difference measurements (i.e., $|T_{SRS\_RX}-T_{PRS\_TX}|$) and SRS-RSRP at multiple wireless devices, such as at the wireless device 402 and at the wireless device 406 of SRS transmitted from wireless device 404. The wireless device 404 may measure the Rx-Tx time difference measurements, and/or PRS-RSRP of the received signals, using assistance data received from the positioning server, the wireless device 402, and/or the wireless device 406. The wireless device 402 and the wireless device 406 may measure the Rx-Tx time difference measurements, and/or SRS-RSRP of the received signals, using assistance data received from the positioning server. The measurements may be used at the positioning server or the wireless device 404 to determine the RTT, which may be used to estimate the location of the wireless device 404. Other methods are possible for determining the RTT, such as for example using time-difference of arrival (TDOA) measurements, such as DL-TDOA and/or UL-TDOA measurements.

DL-AoD positioning may make use of the measured PRS-RSRP of signals transmitted from multiple wireless devices, such as the wireless device 402 and the wireless device 406, and received at the wireless device 404. The AoD positioning may also be referred to as DL-AoD positioning where the PRS are DL signals. The wireless device 404 may measure the PRS-RSRP of the received signals using assistance data received from the positioning server, and the resulting measurements may be used along with the azimuth angle of departure (A-AoD), the zenith angle of departure (Z-AoD), and other configuration information to locate the wireless device 404 in relation to the neighboring wireless devices that transmitted the PRS, such as the wireless device 402 and the wireless device 406.

DL-TDOA positioning may make use of the DL reference signal time difference (RSTD), and/or PRS-RSRP of signals received from multiple wireless devices, such as the wireless device 402 and the wireless device 406, at the wireless device 404. The wireless device 404 may measure the RSTD, and/or the PRS-RSRP, of the received PRS signals using assistance data received from the positioning server, and the resulting measurements may be used along with other configuration information to locate the wireless device 404 in relation to the neighboring wireless devices that transmitted the PRS, such as the wireless device 402 and the wireless device 406.

UL-TDOA positioning may make use of the UL relative time of arrival (RTOA), and/or SRS-RSRP, at multiple wireless devices, such as the wireless device 402 and the wireless device 406, of signals transmitted from the wireless device 404. The wireless devices, such as the wireless device 402 and the wireless device 406, may measure the RTOA, and/or the SRS-RSRP, of the received signals using assistance data received from the positioning server, and the resulting measurements may be used along with other configuration information to estimate the location of the wireless device 404.

UL-AoA positioning may make use of the measured azimuth angle of arrival (A-AoA) and zenith angle of arrival (Z-AoA) at multiple wireless devices, such as the wireless device 402 and the wireless device 406, of signals transmitted from the wireless device 404. The wireless device 402 and the wireless device 406 may measure the A-AoA and the Z-AoA of the received signals using assistance data received from the positioning server, and the resulting measurements may be used along with other configuration information to estimate the location of the wireless device 404.

Additional positioning methods may be used for estimating the location of the wireless device 404, such as for example, UL-AoD and/or DL-AoA at the wireless device 404. Note that data/measurements from various technologies may be combined in various ways to increase accuracy, to determine and/or to enhance certainty, to supplement/complement measurements, and/or to substitute/provide for missing information.

Figure 5:
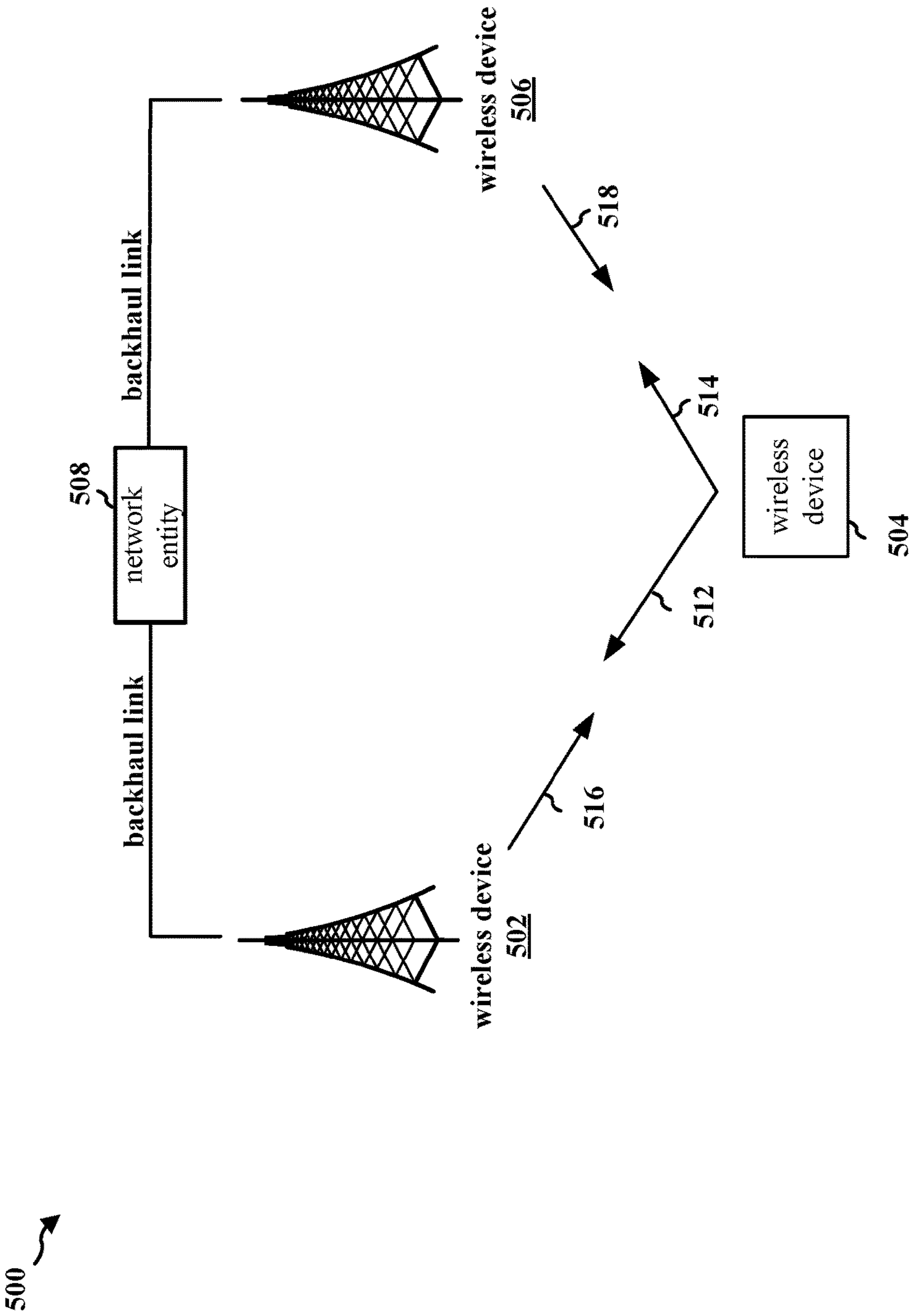
FIG. 5 is a diagram illustrating another example of positioning based on positioning signal measurements.

FIG. 5 is a diagram 500 illustrating a network entity 508 that may be configured to coordinate a wireless device 502 and a wireless device 506 to perform positioning with a wireless device 504. The location of the wireless device 502 and the wireless device 506 may be known to at least one device, such as the wireless device 502, the wireless device 504, the wireless device 506, and/or the network entity 508. The wireless device 502 may be a base station, a gNB, or a TRP. The wireless device 506 may be a base station, a gNB, or a TRP. The wireless device 504 may be a UE or a PRU. The network entity 508 may be connected to the wireless device 502 and the wireless device 506 via a physical link, for example a backhaul link or a midhaul link, or via a wireless link, such as an air interface (Uu) link. The network entity 508 may be part of a core network, such as an LMF or a set of location servers. The network entity 508 may configure positioning occasions between the wireless device 502, the wireless device 504, and the wireless device 506.

To perform positioning, the network entity 508 may configure the wireless devices to transmit positioning signals at one another. For example, the wireless device 504 may transmit the set of positioning signals 512 at the wireless device 502. The set of positioning signals 512 may be a set of SRSs, SSBs, or CSI-RSs. The wireless device 502 may measure the set of positioning signals 512. The wireless device 502 may transmit the set of positioning signals 516 at the wireless device 504. The set of positioning signals 516 may be a set of PRSs, SSBs, or CSI-RSs. The wireless device 504 may measure the set of positioning signals 516. The wireless device 504 may transmit a set of positioning signals 514 at the wireless device 506. The set of positioning signals 514 may be a set of SRSs, SSBs, or CSI-RSs. The wireless device 506 may measure the set of positioning signals 514. The wireless device 506 may transmit a set of positioning signals 518 at the wireless device 504. The set of positioning signals 518 may be a set of PRSs, SSBs, or CSI-RSs. The wireless device 504 may measure the set of positioning signals 518. One or more of the wireless devices may measure the received positioning signals to calculate a positioning measurement that may be used to calculate a location of the wireless device 504, or may be used to calculate a position or a location of the wireless device 504. For example, if the location of the wireless device 502 and the location of the wireless device 506 are known, the location of the wireless device 504 may be calculated based on a RTT between the wireless device 502 and the wireless device 504, and a RTT between the wireless device 504 and the wireless device 506. In another example, the wireless device 504 may calculate an angle of arrival (AoA) or an angle of departure (AoD) of the set of positioning signals 516, and may calculate an AoA or an AoD of the set of positioning signals 518. The calculated AoAs and/or AoDs may be used to calculate a position of the wireless device 504 if the location of the wireless device 502 and the location of the wireless device 506 are also known. Other measurements, such as RTOA, line-of-sight (LOS) identification (identifying whether there is a direct line-of-sight path between wireless devices), or multi-cell round trip time (multi-RTT) calculations may be performed to calculate the position of the wireless device 504, or to calculate a measurement that may be used to calculate the position of the wireless device 504.

In some aspects, a positioning model may be used to calculate one or more positioning metrics based on the measurements. For example, based on the measurements of the set of positioning signals 516 and/or the set of positioning signals 518 by the wireless device 504, a position of the wireless device 504 may be calculated or estimated, or an intermediate measurement that may be used to calculate the location of the wireless device 504 may be calculated or estimated. A positioning model may be trained using artificial intelligence (AI)/machine learning (ML) (AI/ML or AIML), based on a set of inputs (e.g., measurements of positioning signals, assistance information associated with the positioning signals) and a set of labels. A positioning signal may include any reference signal transmitted from a wireless device, such as a PRS, a SRS, an SSB, or a CSI-RS. An RS transmitted from a network node, such as a TRP or a base station, may be referred to as a downlink RS, or a DL-RS. A measurement may be a channel impulse response (CIR) or other measurement used for performing positioning on a target wireless device. A label may be a calculated, derived, or given (i.e., known) expected result associated with a set of inputs, such as a location of a wireless device 504 or an intermediate measurement (e.g., a timing measurement, an angle measurement, a LOS identification) that may be used to calculate the location of the wireless device 504. A set of inputs and a set of labels may be used for generating and/or training a positioning model using AI/ML.

When training a positioning model, measurements of positioning signals as inputs, clean or noisy labels (clean labels may have a quality metric greater or equal to a threshold, noisy labels may have a quality metric less than or equal to the threshold) as expected outputs, and training data assistance information as inputs or expected outputs. The positioning model may operate on any wireless device based on a set of inputs. For example, the wireless device 504 may have a positioning model configured to accept a set of positioning measurements and generate an estimate of a location of the wireless device 504. In another example, the wireless device 504 may have a positioning model configured to accept a set of positioning measurements and generate an intermediate measurement (e.g., a timing measurement, an angle measurement, a LOS identification) that may be used (by the wireless device 504, or another entity, such as the network entity 508, the wireless device 502, or the wireless device 506) to calculate the location of the wireless device 504. In another example, the wireless device 502 or the wireless device 506 may have a positioning model configured to accept a set of positioning measurements and generate an estimate of a location of the wireless device 504. In another example, the wireless device 502 or the wireless device 506 may have a positioning model configured to accept a set of positioning measurements and generate an intermediate measurement that may be used to calculate the location of the wireless device 504. In another example, the network entity 508 may have a positioning model configured to accept a set of positioning measurements and generate an estimate of a location of the wireless device 504. In some aspects, the positioning measurements may be measured by the entity with the positioning model, for example the wireless device 504 may measure the set of positioning signals 516 and may measure the set of positioning signals 518, and may use those measurements as inputs to a positioning model at the wireless device 504. In some aspects, the positioning measurements may be measured and aggregated by the entity with the positioning model, for example the wireless device 502 may measure the set of positioning signals 512, and may aggregate measurements from the wireless device 506 and/or the wireless device 504 to use as inputs to a positioning model. In some aspects, the positioning measurements may be aggregated by the entity with the positioning model. For example, the network entity 508 may aggregate measurements from the wireless device 502, the wireless device 504, and the wireless device 506 to use as inputs to a positioning model.

A positioning model may be trained on a wireless device that performs positioning, such as the wireless device 502, the wireless device 504, the wireless device 506 and/or the network entity 508, or may be trained on an offline device, such as an over-the-top (OTT) server. The inputs to the positioning model may include measurements of positioning signals, such as measurements of SRS, PRS, SSB, and/or CSI-RS. The inputs to the measurements may include assistance information associated with the measured positioning signals, such as BWP of a positioning signal resource, number of TRPs, beam information, positioning signal configuration). The labels/outputs for the positioning model may include a location, or an intermediate measurement (e.g., timing, angle, LOS indication, etc.).

In some aspects, a positioning model may be configured to use measurements of DL-RS transmitted from one or more network nodes to calculate a position of the wireless device 504, or to calculate an intermediate measurement that may be used to calculate the position of the wireless device 504. The positioning model may be trained via a training entity, and may be used at the wireless device 504 or the network entity 508. For example, a positioning model at the wireless device 504 may be configured to calculate the location of the wireless device 504 based on measurements of the set of positioning signals 516 and the set of positioning signals 518. In another example, a positioning model at the wireless device 504 may be configured to calculate a set of intermediate measurements based on measurements of the set of positioning signals 516 and the set of positioning signals 518. The wireless device 504 may transmit the set of intermediate measurements to the network entity 508 so that the network entity 508 may calculate the location of the wireless device 504 based on the set of intermediate measurements. In another example, the wireless device 504 may transmit measurements of the set of positioning signals 516 and the set of positioning signals 518 to the network entity 508. The positioning model may be at the network entity 508. The positioning model at the network entity 508 may calculate the location of the wireless device 504 based on the transmitted measurements of the set of positioning signals 516 and the set of positioning signals 518.

Measurements of DL-RS may be performed by measuring channels between a target device (e.g., the wireless device 504) and a set of network nodes (e.g., the wireless device 502 and the wireless device 506). The set of network nodes may transmit a reference signal, such as a PRS, SSB, or a CSI-RS. The wireless device 504 may measure the DL-RS for data collection purposes to train a positioning model. The wireless device 504 may measure a DL-RS resource in a plurality of ways, for example the measurement may be a channel impulse response (CIR), a channel frequency response (CFR), a received signal strength indicator (RSSI), a reference signal received power (RSRP), a reference signal received power path (RSRPP), a reference signal received quality (RSRQ), a time of arrival (ToA), time of flight (ToF), a reference signal time difference (RSTD), or an angle of departure (AoD). In some aspects, a network (e.g., a mobile/private network operator) may assign different power settings for transmitting a DL signal for different cells to ensure optimal coverage. For example, the network entity 508 may assign a first Tx power setting to the wireless device 502 to transmit DL Tx signals, and may assign a second Tx power setting to the wireless device 506 to transmit DL Tx signals. Over time, the wireless devices may transmit DL-RSs using different Tx power settings. For example, the wireless device 502 may transmit DL-RSs to the wireless device 504 using a first Tx power setting on one day and may transmit DL-RSs to the wireless device 504 using a second Tx power setting on a different day. If a positioning model is trained using a set of measurements transmitted using a first power setting, the positioning model may not be accurate if it is then fed inputs of a set of measurements using a second power setting, different from the first power setting. In order for a positioning model to be robust for different Tx power settings, the positioning model may be trained to consider Tx power heterogeneity of DL-based measurements. In other words, to collect training data, network nodes may be configured to transmit DL-RSs using different Tx power settings, and target wireless devices may be configured to measure DL-RSs at different Tx power settings.

Figure 6:
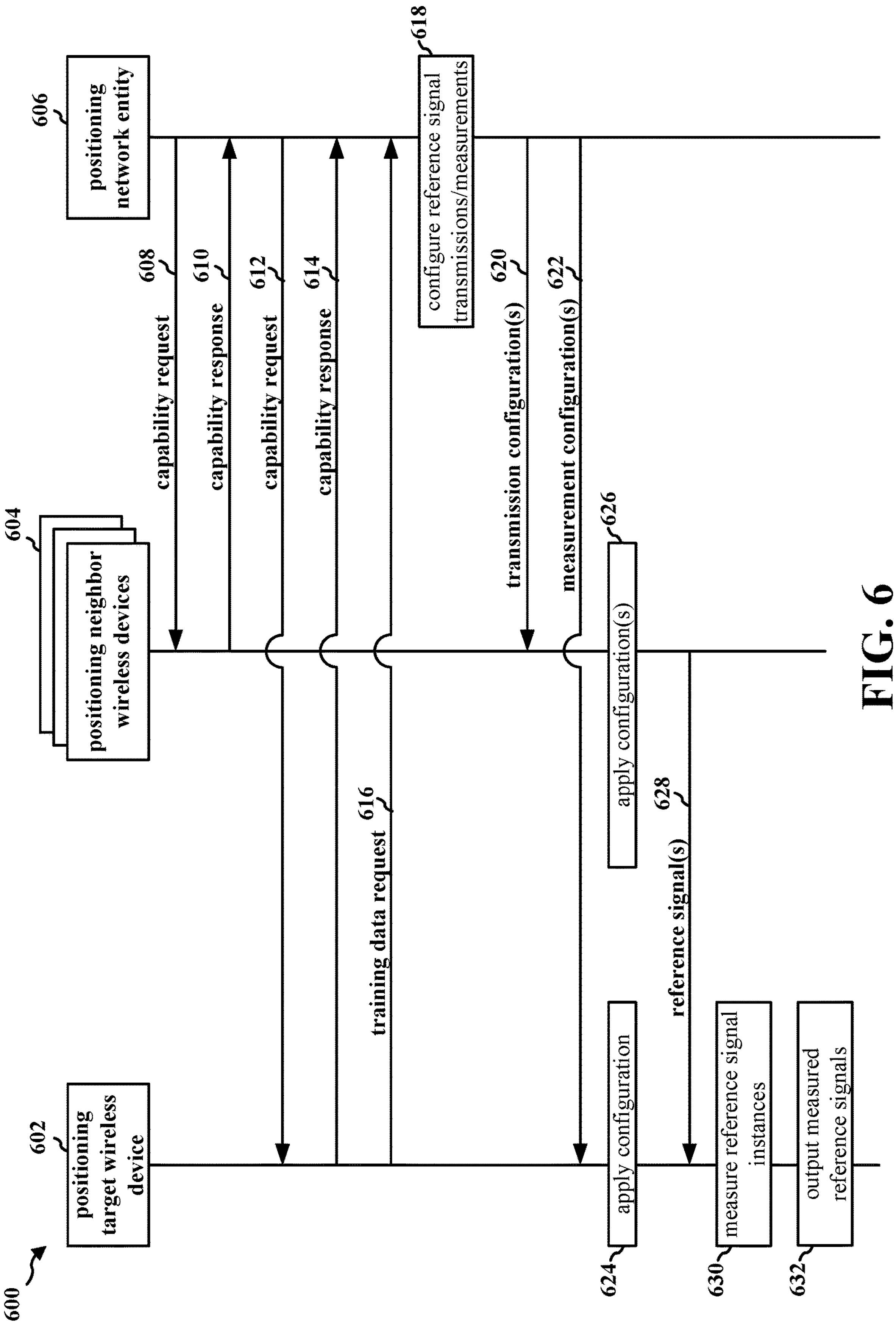
FIG. 6 is a connection flow diagram illustrating an example of a wireless device configured to collect reference signal measurements having different power levels to train a positioning model.

FIG. 6 is a connection flow diagram 600 illustrating an example of communications between a positioning target wireless device 602, a set of positioning neighbor wireless devices 604, and a positioning network entity 606. A wireless device may be configured to collect training data used to train a positioning model. For example, the positioning target wireless device 602 may collect training data used to train a positioning model. The positioning model may be configured to calculate a position of the positioning target wireless device 602 and/or a set of measurements that may be used to calculate the position of the positioning target wireless device 602. The positioning target wireless device 602 may be a UE or a PRU. The PRU may have a set of sensors that may be used to calculate the location of the PRU with a high degree of accuracy, such as a LIDAR sensor, a GNSS device, or a WLAN system configured to calculate a location of the positioning target wireless device 602 based on received WLAN signals. The PRU may be a fixed PRU with a known location, or may be a mobile PRU that is placed in a known location for the duration of collecting measurements for training the positioning model. The set of positioning neighbor wireless devices 604 may include a set of base stations and/or a set of TRPs configured to transmit positioning signals at the positioning target wireless device 602. The positioning network entity 606 may include an LMF, or may include one or more location servers. The positioning network entity 606 may be configured to configure positioning occasions between the positioning target wireless device 602 and the set of positioning neighbor wireless devices 604. The positioning network entity 606 may be configured to configure measurements by the positioning target wireless device 602 corresponding with different Tx power settings to improve the robustness of training a positioning model using such measurements.

The positioning network entity 606 may transmit a capability request 608 to the set of positioning neighbor wireless devices 604. The set of positioning neighbor wireless devices 604 may receive the capability request 608. The capability request 608 may request for the set of positioning neighbor wireless devices 604 to indicate whether the network node may transmit DL-RS resources with different Tx power settings. The set of positioning neighbor wireless devices 604 may transmit a capability response 610 to the positioning network entity 606. The positioning network entity 606 may receive the capability response 610. The capability response 610 may indicate the ability of the network node to transmit DL-RS resources with different Tx power settings. The capability response 610 may indicate a number of Tx power realizations that the network node may support. The capability response 610 may indicate the Tx power settings that may be supported (e.g., Tx power levels, granularity of controlling Tx power to frequency resources). The capability request 608 and the capability response 610 may be exchanged as part of an NRPPa protocol. For example, the capability request 608 and the capability response 610 may be exchanged as part of a measurement information transfer procedure. In some aspects, a new procedure may be defined for the capability request 608 and the capability response 610 to enable training data collection for training a positioning model based on the measurements of DL-RS with different Tx power settings.

The positioning network entity 606 may transmit a capability request 612 to the positioning target wireless device 602. The positioning target wireless device 602 may receive the capability request 612. The capability request 612 may request for the positioning target wireless device 602 to indicate whether the wireless device may measure DL-RS resources with different Tx power settings. The positioning target wireless device 602 may transmit a capability response 614 to the positioning network entity 606. The positioning network entity 606 may receive the capability response 614. The capability response 614 may indicate the ability of the wireless device to measure DL-RS resources with different Tx power settings. The capability response 614 may indicate a number of Tx power realizations that the wireless device may support. The capability response 614 may indicate related buffering capability of the wireless device for each of the number of Tx power realizations. The capability response 614 may a set of measurement gap conditions that may enable the wireless device to process redundant DL-RS measurements of different Tx power settings. The capability request 612 and the capability response 614 may be exchanged as an LPP message, for example as part of an LPPa protocol. For example, the capability request 612 and the capability response 614 may be exchanged as part of an assistance data exchange procedure. In some aspects, a new procedure may be defined for the capability request 612 and the capability response 614 to enable training data collection for training a positioning model based on the measurements of DL-RS with different Tx power settings.

In some aspects, the positioning target wireless device 602 may transmit a training data request 616 to the positioning network entity 606. The positioning network entity 606 may receive the training data request 616 from the positioning target wireless device 602. The training data request 616 may include an indication of a request for the positioning network entity 606 to configure different Tx powers at the set of positioning neighbor wireless devices 604 so that the positioning target wireless device 602 may collect DL-RS measurements with different Tx power settings.

At 618, the positioning network entity 606 may configure the set of positioning neighbor wireless devices 604 to run redundant DL-RS transmissions with different Tx power settings. The positioning network entity 606 may configure the positioning target wireless device 602 to measure the redundant DL-RS transmissions with different Tx power settings. In some aspects, the positioning network entity 606 may configure the configurations at 618 in response to receiving the training data request 616. In some aspects, the positioning network entity 606 may configure the configurations at 618 in response to receiving the capability response 610 and the capability response 614 indicating that the positioning target wireless device 602 and the set of positioning neighbor wireless devices 604 are capable of running and measuring redundant DL-RS transmissions with different Tx power settings.

The positioning network entity 606 may transmit a set of transmission configurations 620 to the set of positioning neighbor wireless devices 604. The set of positioning neighbor wireless devices 604 may receive the set of transmission configurations 620 from the positioning network entity 606. At 626, the set of positioning neighbor wireless devices 604 may apply the set of transmission configurations 620 to transmit the set of RSs 628 at the positioning target wireless device 602 with different Tx power settings The positioning network entity 606 may transmit a set of measurement configurations 622 to the positioning target wireless device 602. The positioning target wireless device 602 may receive the set of measurement configurations 622 from the positioning network entity 606. At 624, the positioning target wireless device 602 may apply the set of measurement configurations 622 to measure the set of RSs 628 at the positioning target wireless device 602 with different Tx power settings. At 630, the positioning target wireless device 602 may measure the set of RSs 628 with different Tx power settings.

At 632, the positioning target wireless device 602 may output the measured reference signals for a training of a positioning model. In some aspects, the positioning model may be located at the positioning target wireless device 602. The positioning target wireless device 602 may train the positioning model locally based on the measured reference signals with different Tx power settings. In some aspects, the positioning model may be located at a training entity, for example at one of the set of positioning neighbor wireless devices 604, at the positioning network entity 606, or at an offline device, such as an OTT server. The positioning target wireless device 602 may transmit the measured reference signals to the training entity so that the training entity may use the measured reference signals to train the positioning model.

Figure 7:
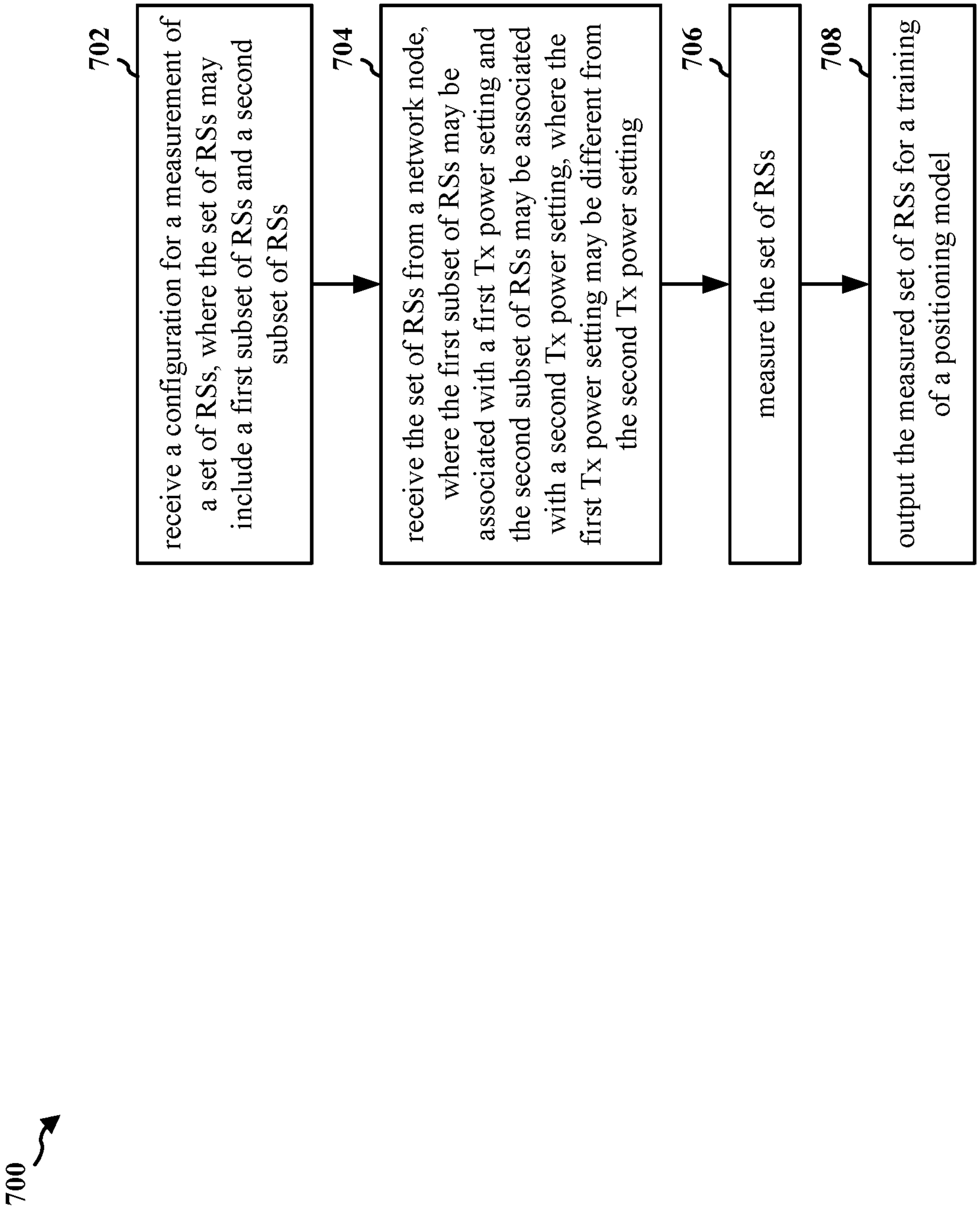
FIG. 7 is a flowchart of a method of wireless communication.

FIG. 7 is a flowchart 700 of a method of wireless communication. The method may be performed by a wireless device (e.g., the UE 104, the UE 350; the wireless device 404, the wireless device 504; the positioning target wireless device 602; the apparatus 1004). At 702, the wireless device may receive a configuration for a measurement of a set of RSs, where the set of RSs may include a first subset of RSs and a second subset of RSs. For example, 702 may be performed by the positioning target wireless device 602, which may receive the set of measurement configurations 622 for a measurement of the set of RSs 628. The set of RSs may include a first subset of RSs and a second subset of RSs. Moreover, 702 may be performed by the component 198 in FIG. 1, 3, or 10.

At 704, the wireless device may receive the set of RSs from a network node, where the first subset of RSs may be associated with a first Tx power setting and the second subset of RSs may be associated with a second Tx power setting, where the first Tx power setting may be different from the second Tx power setting. For example, 704 may be performed by the positioning target wireless device 602, which may receive the set of RSs 628 from each of the set of positioning neighbor wireless devices 604. The first subset of RSs may be transmitted with a first Tx power setting and the second subset of RSs may be associated with a second Tx power setting. The first Tx power setting may be different from the second Tx power setting. Moreover, 704 may be performed by the component 198 in FIG. 1, 3, or 10.

At 706, the wireless device may measure the set of RSs. For example, 706 may be performed by the positioning target wireless device 602, which, at 630, may measure the set of RSs 628. Moreover, 706 may be performed by the component 198 in FIG. 1, 3, or 10.

At 708, the wireless device may output the measured set of RSs for a training of a positioning model. For example, 708 may be performed by the positioning target wireless device 602, which may, at 632, output the measured set of RSs for a training of a positioning model. Moreover, 708 may be performed by the component 198 in FIG. 1, 3, or 10.

Figure 8:
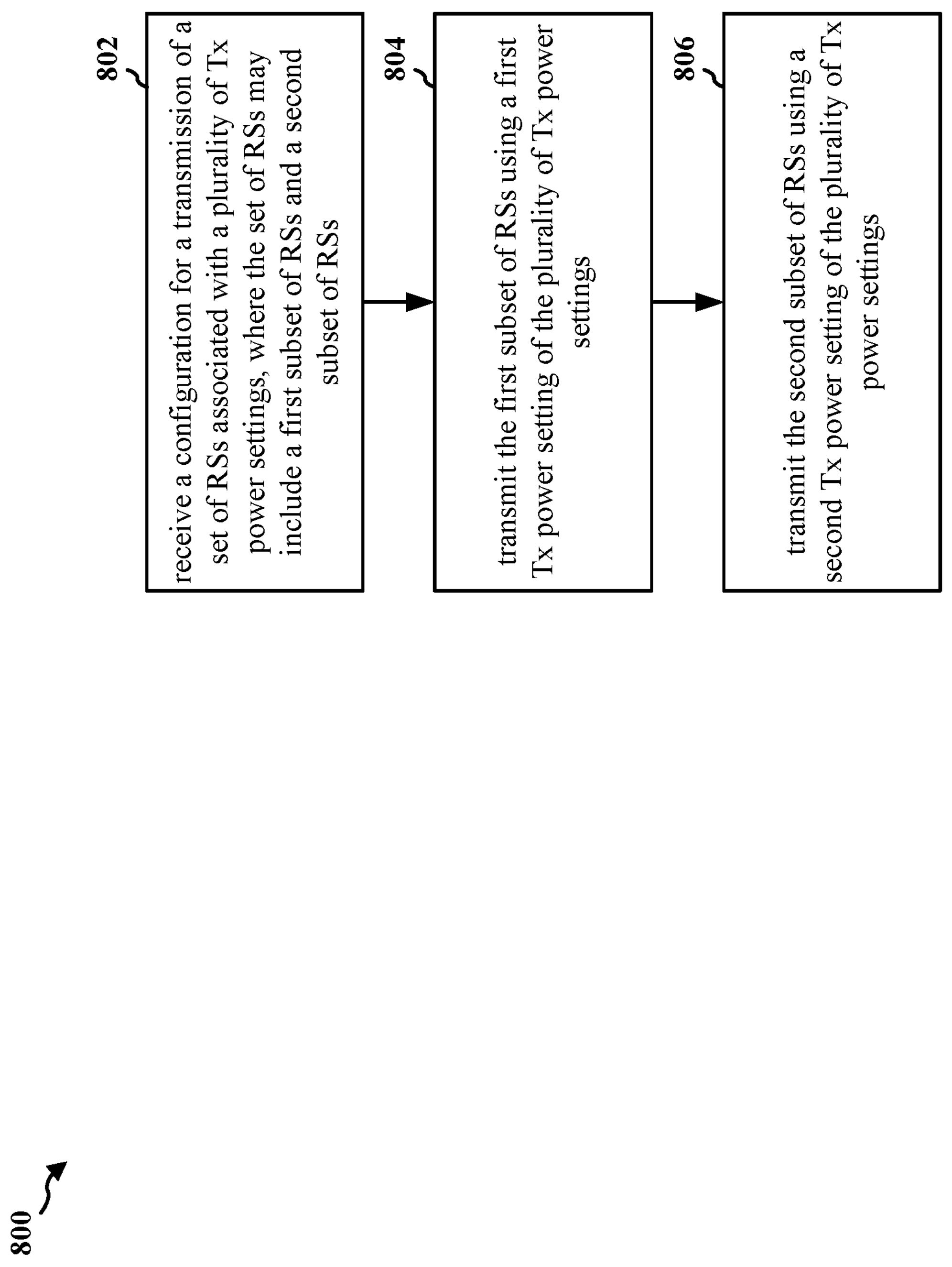
FIG. 8 is a flowchart of a method of wireless communication.

FIG. 8 is a flowchart 800 of a method of wireless communication. The method may be performed by a network node (e.g., the base station 102, the base station 310; the wireless device 402, the wireless device 406, the wireless device 502, the wireless device 506; one of the set of positioning neighbor wireless devices 604; the network entity 1002, the network entity 1102, the network entity 1260). At 802, the network node may receive a configuration for a transmission of a set of RSs associated with a plurality of Tx power settings, where the set of RSs may include a first subset of RSs and a second subset of RSs. For example, 802 may be performed by one of the set of positioning neighbor wireless devices 604, which may receive the set of transmission configurations 620 for a transmission of the set of RSs 628 associated with a plurality of Tx power settings. The set of RSs 628 may include a first subset of RSs and a second subset of RSs. Moreover, 802 may be performed by the component 199 in FIG. 1, 3, or 11.

At 804, the network node may transmit the first subset of RSs using a first Tx power setting of the plurality of Tx power settings. For example, 804 may be performed by one of the set of positioning neighbor wireless devices 604, which may transmit the first subset of RSs of the set of RSs 628 using a first Tx power setting of the plurality of Tx power settings. Moreover, 804 may be performed by the component 199 in FIG. 1, 3, or 11.

At 806, the network node may transmit the second subset of RSs using a second Tx power setting of the plurality of Tx power settings. For example, 806 may be performed by one of the set of positioning neighbor wireless devices 604, which may transmit the second subset of RSs of the set of RSs 628 using a second Tx power setting of the plurality of Tx power settings. Moreover, 806 may be performed by the component 199 in FIG. 1, 3, or 11.

Figure 9:
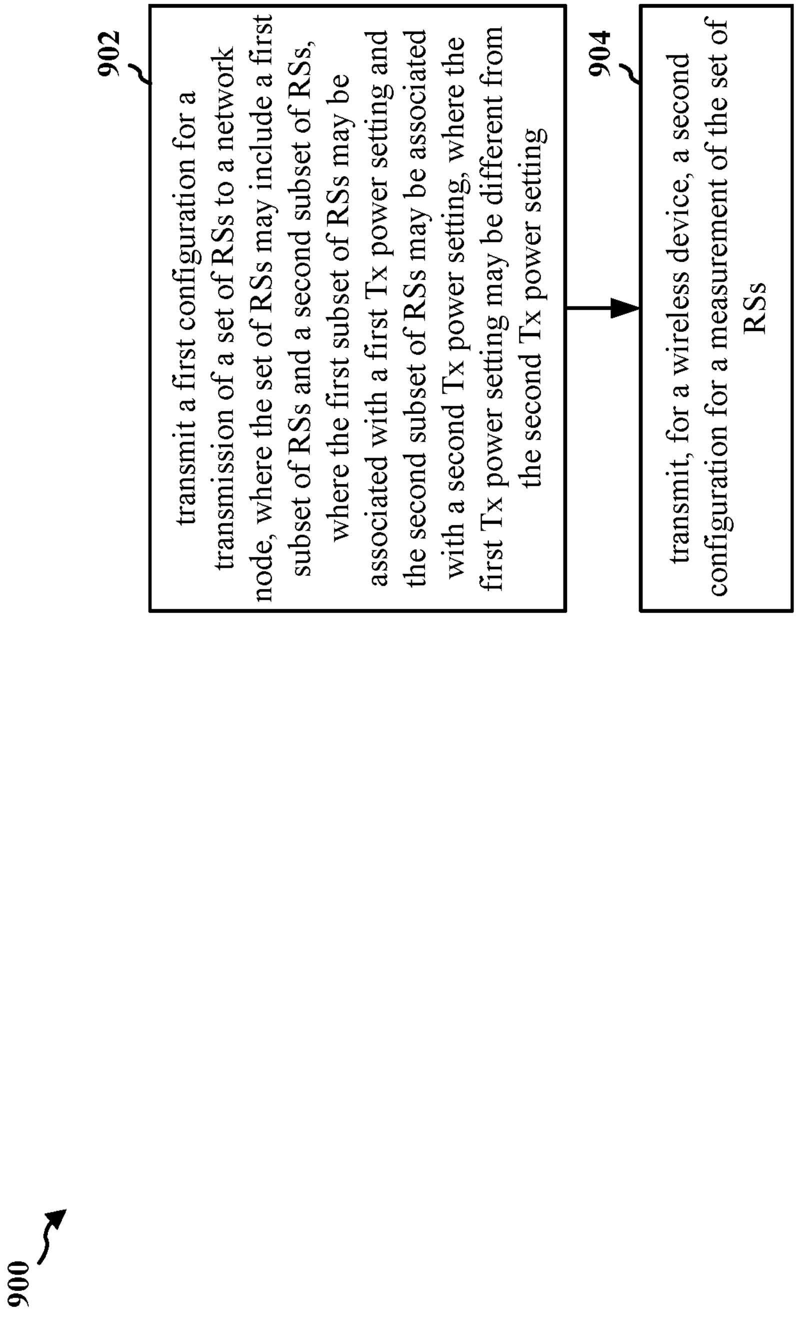
FIG. 9 is a flowchart of a method of wireless communication.

FIG. 9 is a flowchart 900 of a method of wireless communication. The method may be performed by a network entity (e.g., the base station 102, the base station 310; the wireless device 402, the wireless device 406, the wireless device 502, the wireless device 506; the positioning network entity 606; the network entity 508, the network entity 1002, the network entity 1102, the network entity 1260). At 902, the network entity may transmit a first configuration for a transmission a set of RSs to a network node. The set of RSs may include a first subset of RSs and a second subset of RSs, where the first subset of RSs may be associated with a first Tx power setting and the second subset of RSs may be associated with a second Tx power setting. The first Tx power setting may be different from the second Tx power setting. For example, 902 may be performed by the positioning network entity 606 in FIG. 6, which may transmit the set of transmission configurations 620 for a transmission of the set of RSs 628 to the set of positioning neighbor wireless devices 604. The set of RSs 628 may include a first subset of RSs and a second subset of RSs. The first subset of RSs may be associated with a first Tx power setting and the second subset of RSs may be associated with a second Tx power setting. The first Tx power setting may be different from the second Tx power setting. Moreover, 902 may be performed by the component 197 in FIG. 1, 3, 11, or 12.

At 904, the network entity may transmit, for a wireless device, a second configuration for a measurement of the set of RSs. For example, 904 may be performed by the positioning network entity 606, which may transmit, for the positioning target wireless device 602, the set of measurement configurations 622 for a measurement of the set of RSs 628. Moreover, 904 may be performed by the component 197 in FIG. 1, 3, 11, or 12.

Figure 10:
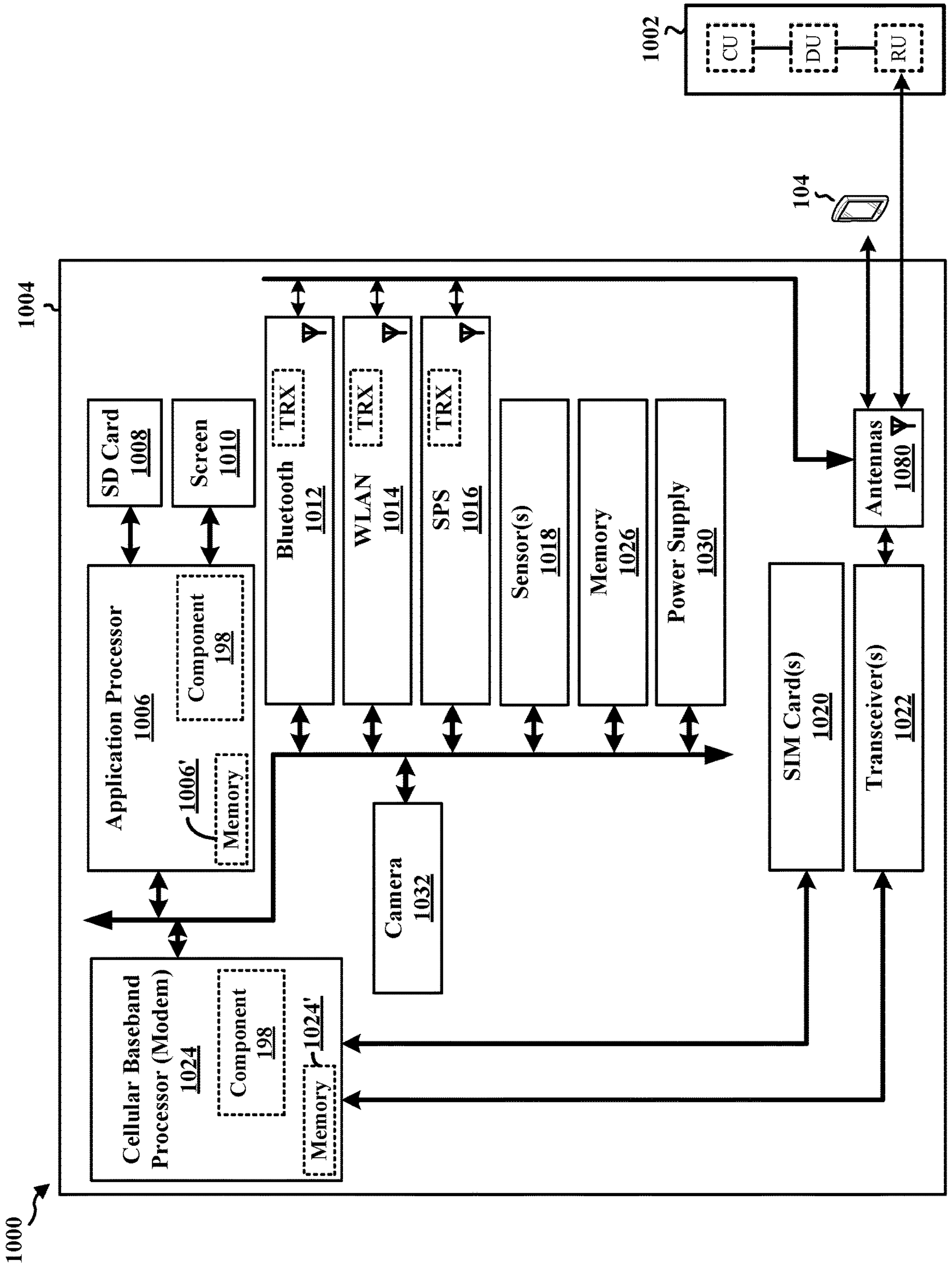
FIG. 10 is a diagram illustrating an example of a hardware implementation for an example apparatus and/or network entity.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include a cellular baseband processor 1024 (also referred to as a modem) coupled to one or more transceivers 1022 (e.g., cellular RF transceiver). The cellular baseband processor 1024 may include on-chip memory 1024'. In some aspects, the apparatus 1004 may further include one or more subscriber identity modules (SIM) cards 1020 and an application processor 1006 coupled to a secure digital (SD) card 1008 and a screen 1010. The application processor 1006 may include on-chip memory 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRX) (or in some cases, just a receiver (RX)). The Bluetooth module 1012, the WLAN module 1014, and the SPS module 1016 may include their own dedicated antennas and/or utilize the antennas 1080 for communication. The cellular baseband processor 1024 communicates through the transceiver(s) 1022 via one or more antennas 1080 with the UE 104 and/or with an RU associated with a network entity 1002. The cellular baseband processor 1024 and the application processor 1006 may each include a computer-readable medium/memory 1024', 1006', respectively. The additional memory modules 1026 may also be considered a computer-readable medium/memory. Each computer-readable medium/memory 1024', 1006', 1026 may be non-transitory. The cellular baseband processor 1024 and the application processor 1006 are each responsible for general processing, including the execution of software stored on the computer-readable medium/memory. The software, when executed by the cellular baseband processor 1024/application processor 1006, causes the cellular baseband processor 1024/application processor 1006 to perform the various functions described supra. The computer-readable medium/memory may also be used for storing data that is manipulated by the cellular baseband processor 1024/application processor 1006 when executing software. The cellular baseband processor 1024/application processor 1006 may be a component of the UE 350 and may include the memory 360 and/or at least one of the TX processor 368, the RX processor 356, and the controller/processor 359. In one configuration, the apparatus 1004 may be a processor chip (modem and/or application) and include just the cellular baseband processor 1024 and/or the application processor 1006, and in another configuration, the apparatus 1004 may be the entire UE (e.g., see UE 350 of FIG. 3) and include the additional modules of the apparatus 1004.

As discussed supra, the component 198 may be configured to receive a configuration for a measurement of a set of RSs. The set of RSs may include a first subset of RSs and a second subset of RSs. The component 198 may be configured to receive the set of RSs from a network node. The first subset of RSs may be associated with a first Tx power setting and the second subset of RSs may be associated with a second Tx power setting. The first Tx power setting may be different from the second Tx power setting. The component 198 may be configured to measure the set of RSs. The component 198 may be configured to output the measured set of RSs for a training of a positioning model. The component 198 may be within the cellular baseband processor 1024, the application processor 1006, or both the cellular baseband processor 1024 and the application processor 1006. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1004 may include a variety of components configured for various functions. In one configuration, the apparatus 1004, and in particular the cellular baseband processor 1024 and/or the application processor 1006, may include means for receiving a configuration for a measurement of a set of RSs. The set of RSs may include a first subset of RSs and a second subset of RSs. The apparatus 1004 may include means for receiving the set of RSs from a network node, wherein the first subset of RSs is associated with a first transmission (Tx) power setting and the second subset of RSs is associated with a second Tx power setting, wherein the first Tx power setting is different from the second Tx power setting. The apparatus 1004 may include means for measuring the set of RSs. The apparatus 1004 may include means for outputting the measured set of RSs for a training of a positioning model. The positioning model may be located at the apparatus 1004. The apparatus 1004 may include means for outputting the measured set of RSs by training the positioning model based on the measured set of RSs. The apparatus 1004 may include means for outputting the measured set of RSs by transmitting the measured set of RSs to a training entity for the training of the positioning model. The apparatus 1004 may include means for receiving a request for a capability to measure the first subset of RSs associated with the first Tx power setting and the second subset of RSs associated with the second Tx power setting. The apparatus 1004 may include means for transmitting an indication of the capability associated with the wireless device to measure the first subset of RSs associated with the first Tx power setting and the second subset of RSs associated with the second Tx power setting. The apparatus 1004 may include means for transmitting the indication by transmitting a long-term evolution (LTE) positioning protocol (LPP) message including the indication. The capability may include at least one of (a) a number of subsets of RSs for the wireless device to measure, (b) a buffering capability, or (c) a measurement gap condition between subsets of the set of RSs. The configuration may include a first indicator associated with the first Tx power setting and a second indicator associated with the second Tx power setting. The first indicator may include at least one of a power level, a resource block (RB) power assignment, or a resource element (RE) power assignment. The apparatus 1004 may include means for receiving a third indicator of a map that correlates each of a plurality of RS resources with each of a plurality of Tx power settings. The first indicator may identify a first RS resource of the plurality of RS resources. The second indicator may identify a second RS resource of the plurality of RS resources. The map may be a table or a matrix that a wireless device may use to correlate an RS resource with a Tx power setting. The apparatus 1004 may receive an indicator of a map, such as an index to a map for the wireless device to use. The apparatus 1004 may include means for transmitting a request to measure a transmitted set of RSs associated with a plurality of Tx power settings. The reception of the set of RSs from the network node may be based on the request. The apparatus 1004 may include means for receiving the configuration by receiving a long-term evolution (LTE) positioning protocol (LPP) message including the configuration. The set of RSs may include at least one of a positioning reference signal (PRS), a synchronization signal block (SSB), or a channel state information (CSI) reference signal (CSI-RS). The apparatus 1004 may include at least one of a UE or a PRU. The measured set of RSs may include at least one of (a) a channel impulse response (CIR), (b) a channel frequency response (CFR), (c) a received signal strength indicator (RSSI), (d) a reference signal received power (RSRP), (e) a reference signal received power path (RSRPP), (f) a reference signal received quality (RSRQ), (g) a time of arrival (ToA), (h) a reference signal time difference (RSTD), or (i) an angle of departure (AoD). The means may be the component 198 of the apparatus 1004 configured to perform the functions recited by the means. As described supra, the apparatus 1004 may include the TX processor 368, the RX processor 356, and the controller/processor 359. As such, in one configuration, the means may be the TX processor 368, the RX processor 356, and/or the controller/processor 359 configured to perform the functions recited by the means.

Figure 11:
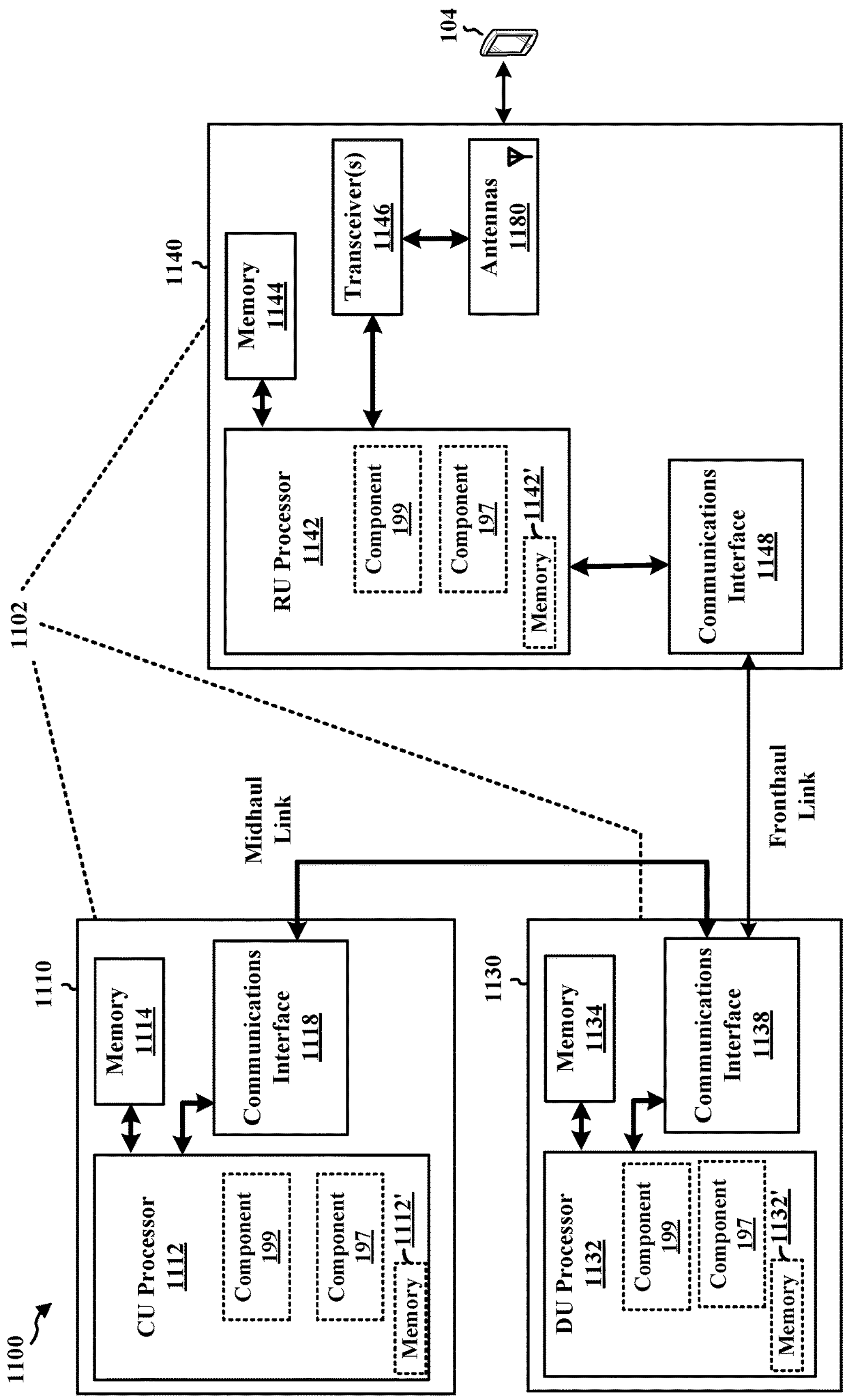
FIG. 11 is a diagram illustrating an example of a hardware implementation for an example network entity.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the component 199, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include a CU processor 1112. The CU processor 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include a DU processor 1132. The DU processor 1132 may include on-chip memory 1132'. In some aspects, the DU 1130 may further include additional memory modules 1134 and a communications interface 1138. The DU 1130 communicates with the RU 1140 through a fronthaul link. The RU 1140 may include an RU processor 1142. The RU processor 1142 may include on-chip memory 1142'. In some aspects, the RU 1140 may further include additional memory modules 1144, one or more transceivers 1146, antennas 1180, and a communications interface 1148. The RU 1140 communicates with the UE 104. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive a configuration for a transmission of a set of RSs associated with a plurality of Tx power settings. The set of RSs may include a first subset of RSs and a second subset of RSs. The component 199 may be configured to transmit the first subset of RSs using a first Tx power setting of the plurality of Tx power settings. The component 199 may be configured to transmit the first subset of RSs using a first Tx power setting of the plurality of Tx power settings. The component 199 may be within one or more processors of one or more of the CU 1110, DU 1130, and the RU 1140. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1102 may include a variety of components configured for various functions. In one configuration, the network entity 1102 may include means for receiving a configuration for a transmission of a set of RSs associated with a plurality of Tx power settings. The set of RSs may include a first subset of RSs and a second subset of RSs. The network entity 1102 may include means for transmitting the first subset of RSs using a first Tx power setting of the plurality of Tx power settings. The network entity 1102 may include means for transmitting the second subset of RSs using a second Tx power setting of the plurality of Tx power settings. The network entity 1102 may include means for receiving a request for a capability to transmit the first subset of RSs associated with the plurality of Tx power settings. The network entity 1102 may include means for transmitting an indication of the capability associated with the network node to measure the first subset of RSs associated with the first Tx power setting and the second subset of RSs associated with the second Tx power setting. The network entity 1102 may include means for transmitting the indication by transmitting a new radio (NR) positioning protocol (NRPP) message including the indication. The capability may include at least one of (a) a number of Tx power settings for the network node to transmit, or (b) a second indication of a second plurality of Tx power settings that the network node supports. The configuration may include a first indicator associated with the first Tx power setting and a second indicator associated with the second Tx power setting. The first indicator may include at least one of a power level, a resource block (RB) power assignment, or a resource element (RE) power assignment. The network entity 1102 may include means for receiving the configuration by receiving a new radio (NR) positioning protocol (NRPP) message including the configuration. The set of RSs may include at least one of a positioning reference signal (PRS), a synchronization signal block (SSB), or a channel state information (CSI) reference signal (CSI-RS). The means may be the component 199 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

As discussed supra, the component 197 may be configured to transmit a first configuration for a transmission of a set of RSs to a network node. The set of RSs may include a first subset of RSs and a second subset of RSs. The first subset of RSs may be associated with a first Tx power setting and the second subset of RSs may be associated with a second Tx power setting. The first Tx power setting may be different from the second Tx power setting. The component 197 may be configured to transmit, for a wireless device, a second configuration for a measurement of the set of RSs. The component 197 may be within one or more processors of one or more of the CU 1110, DU 1130, and the RU 1140. The component 197 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1102 may include a variety of components configured for various functions. In one configuration, the network entity 1102 may include means for transmitting a first configuration for a transmission of a set of RSs to a network node. The set of RSs may include a first subset of RSs and a second subset of RSs. The first subset of RSs may be associated with a first Tx power setting and the second subset of RSs may be associated with a second Tx power setting. The first Tx power setting may be different from the second Tx power setting. The network entity 1102 may include means for transmitting, for a wireless device, a second configuration for a measurement of the set of RSs. The first configuration may include a first indicator associated with the first Tx power setting and a second indicator associated with the second Tx power setting. The first indicator may include at least one of a power level, a resource block (RB) power assignment, or a resource element (RE) power assignment. The second configuration may include a first indicator associated with the first Tx power setting and a second indicator associated with the second Tx power setting. The first indicator may include at least one of a power level, a resource block (RB) power assignment, or a resource element (RE) power assignment. The network entity 1102 may include means for transmitting the first configuration by transmitting a new radio (NR) positioning protocol (NRPP) message including the first configuration. The network entity 1102 may include means for transmitting the second configuration by transmitting a long-term evolution (LTE) positioning protocol (LPP) message including the second configuration. The network entity 1102 may include means for transmitting, to the wireless device, a request for a capability to measure the first subset of RSs associated with the first Tx power setting and the second subset of RSs associated with the second Tx power setting. The network entity 1102 may include means for receiving an indication of the capability associated with the wireless device to measure the first subset of RSs associated with the first Tx power setting and the second subset of RSs associated with the second Tx power setting. The network entity 1102 may include means for configuring the second configuration based on the capability. The network entity 1102 may include means for receiving the indication by receiving a long-term evolution (LTE) positioning protocol (LPP) message including the indication. The capability may include at least one of (a) a number of subsets of RSs for the wireless device to measure, (b) a buffering capability, or (c) a measurement gap condition between subsets of the set of RSs. The network entity 1102 may include means for transmitting, to the network node, a request for a capability to transmit the first subset of RSs associated with the first Tx power setting and the second Tx power setting. The network entity 1102 may include means for receiving an indication of the capability associated with the network node to measure the first subset of RSs associated with the first Tx power setting and the second subset of RSs associated with the second Tx power setting. The network entity 1102 may include means for configuring the first configuration based on the capability. The network entity 1102 may include means for receiving the indication by receiving a new radio (NR) positioning protocol (NRPP) message including the indication. The NRPP message may be part of a transmission reception point (TRP) information exchange procedure. The NRPP message may be exchanged as part of an NRPPa protocol. The capability may include at least one of (a) a number of Tx power settings for transmission by the network node, or (b) a second indication of a second plurality of Tx power settings that the network node supports. The network entity 1102 may include means for receiving a request to measure a transmitted set of RSs associated with a plurality of Tx power settings. The transmission of the first configuration and the transmission of the second configuration may be based on the request. The set of RSs may include at least one of a positioning reference signal (PRS), a synchronization signal block (SSB), or a channel state information (CSI) reference signal (CSI-RS). The wireless device may include at least one of a UE or a PRU. The network entity 1102 may include an LMF. The means may be the component 197 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

Figure 12:
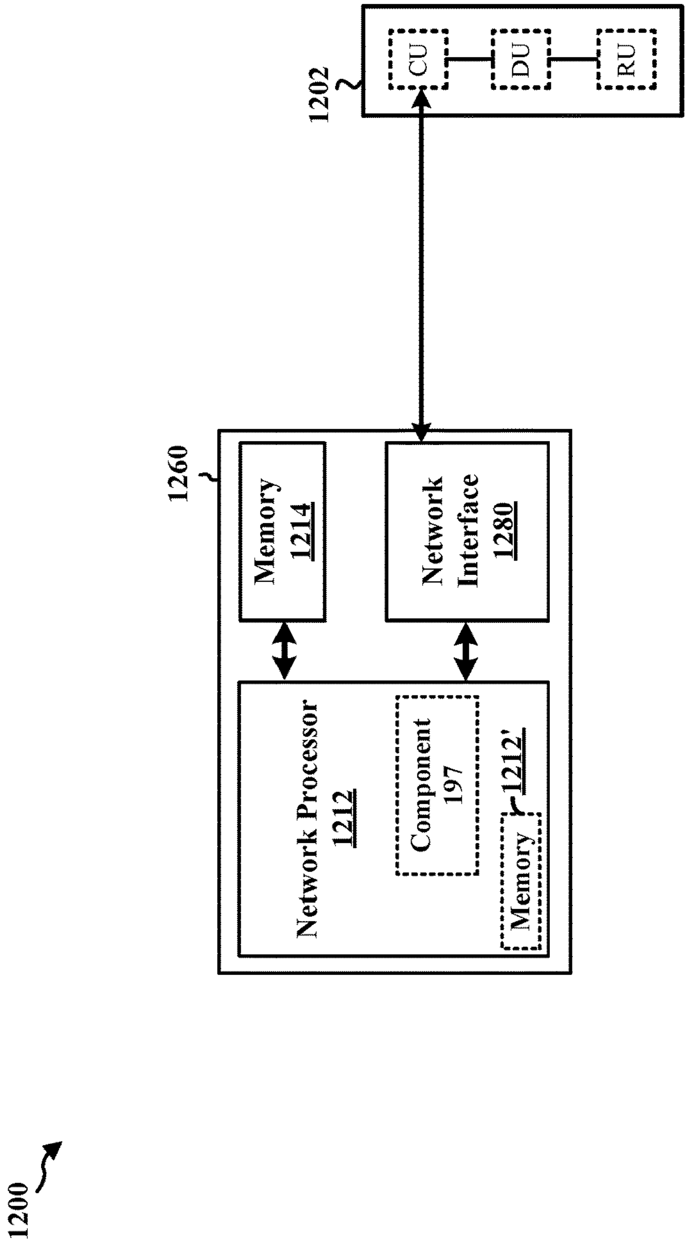
FIG. 12 is a diagram illustrating an example of a hardware implementation for an example network entity.

FIG. 12 is a diagram 1200 illustrating an example of a hardware implementation for a network entity 1260. In one example, the network entity 1260 may be within the core network 120. The network entity 1260 may include a network processor 1212. The network processor 1212 may include on-chip memory 1212'. In some aspects, the network entity 1260 may further include additional memory modules 1214. The network entity 1260 communicates via the network interface 1280 directly (e.g., backhaul link) or indirectly (e.g., through a RIC) with the CU 1202. The on-chip memory 1212' and the additional memory modules 1214 may each be considered a computer-readable medium/memory. Each computer-readable medium/memory may be non-transitory. The processor 1212 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 197 may be configured to transmit a first configuration for a transmission of a set of RSs to a network node. The set of RSs may include a first subset of RSs and a second subset of RSs. The first subset of RSs may be associated with a first Tx power setting and the second subset of RSs may be associated with a second Tx power setting. The first Tx power setting may be different from the second Tx power setting. The component 197 may be configured to transmit, for a wireless device, a second configuration for a measurement of the set of RSs. The component 197 may be within the processor 1212. The component 197 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1260 may include a variety of components configured for various functions. In one configuration, the network entity 1260 may include means for transmitting a first configuration for a transmission of a set of RSs to a network node. The set of RSs may include a first subset of RSs and a second subset of RSs. The first subset of RSs may be associated with a first Tx power setting and the second subset of RSs may be associated with a second Tx power setting. The first Tx power setting may be different from the second Tx power setting. The network entity 1260 may include means for transmitting, for a wireless device, a second configuration for a measurement of the set of RSs. The first configuration may include a first indicator associated with the first Tx power setting and a second indicator associated with the second Tx power setting. The first indicator may include at least one of a power level, a resource block (RB) power assignment, or a resource element (RE) power assignment. The second configuration may include a first indicator associated with the first Tx power setting and a second indicator associated with the second Tx power setting. The first indicator may include at least one of a power level, a resource block (RB) power assignment, or a resource element (RE) power assignment. The network entity 1260 may include means for transmitting the first configuration by transmitting a new radio (NR) positioning protocol (NRPP) message including the first configuration. The network entity 1260 may include means for transmitting the second configuration by transmitting a long-term evolution (LTE) positioning protocol (LPP) message including the second configuration. The network entity 1260 may include means for transmitting, to the wireless device, a request for a capability to measure the first subset of RSs associated with the first Tx power setting and the second subset of RSs associated with the second Tx power setting. The network entity 1260 may include means for receiving an indication of the capability associated with the wireless device to measure the first subset of RSs associated with the first Tx power setting and the second subset of RSs associated with the second Tx power setting. The network entity

1260 may include means for configuring the second configuration based on the capability. The network entity 1260 may include means for receiving the indication by receiving a long-term evolution (LTE) positioning protocol (LPP) message including the indication. The capability may include at least one of (a) a number of subsets of RSs for the wireless device to measure, (b) a buffering capability, or (c) a measurement gap condition between subsets of the set of RSs. The network entity 1260 may include means for transmitting, to the network node, a request for a capability to transmit the first subset of RSs associated with the first Tx power setting and the second Tx power setting. The network entity 1260 may include means for receiving an indication of the capability associated with the network node to measure the first subset of RSs associated with the first Tx power setting and the second subset of RSs associated with the second Tx power setting. The network entity 1260 may include means for configuring the first configuration based on the capability. The network entity 1260 may include means for receiving the indication by receiving a new radio (NR) positioning protocol (NRPP) message including the indication. The NRPP message may be part of a transmission reception point (TRP) information exchange procedure. The NRPP message may be exchanged as part of an NRPPa protocol. The capability may include at least one of (a) a number of Tx power settings for transmission by the network node, or (b) a second indication of a second plurality of Tx power settings that the network node supports. The network entity 1260 may include means for receiving a request to measure a transmitted set of RSs associated with a plurality of Tx power settings. The transmission of the first configuration and the transmission of the second configuration may be based on the request. The set of RSs may include at least one of a positioning reference signal (PRS), a synchronization signal block (SSB), or a channel state information (CSI) reference signal (CSI-RS). The wireless device may include at least one of a UE or a PRU. The network entity 1260 may include an LMF. The means may be the component 197 of the network entity 1260 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive the data, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a wireless device, wherein the method comprises receiving a configuration for a measurement of a set of reference signals (RSs), wherein the set of RSs comprises a first subset of RSs and a second subset of RSs. The method further comprises receiving the set of RSs from a network node, wherein the first subset of RSs is associated with a first transmission (Tx) power setting and the second subset of RSs is associated with a second Tx power setting, wherein the first Tx power setting is different from the second Tx power setting. The method further comprises measuring the set of RSs. The method further comprises outputting the measured set of RSs for a training of a positioning model.

Aspect 2 is the method of aspect 1, wherein the positioning model is located at the wireless device, wherein outputting the measured set of RSs comprises training the positioning model based on the measured set of RSs.

Aspect 3 is the method of aspect 1, wherein outputting the measured set of RSs comprises transmitting the measured set of RSs to a training entity for the training of the positioning model.

Aspect 4 is the method of any of aspects 1 to 3, wherein the method further comprises receiving a request for a capability to measure the first subset of RSs associated with the first Tx power setting and the second subset of RSs associated with the second Tx power setting. The method further comprises transmitting an indication of the capability associated with the wireless device to measure the first subset of RSs associated with the first Tx power setting and the second subset of RSs associated with the second Tx power setting.

Aspect 5 is the method of aspect 4, wherein transmitting the indication comprises transmitting a long-term evolution (LTE) positioning protocol (LPP) message comprising the indication.

Aspect 6 is the method of either of aspects 4 or 5, wherein the capability comprises at least one of (a) a number of subsets of RSs for the wireless device to measure, (b) a buffering capability, or (c) a measurement gap condition between subsets of the set of RSs.

Aspect 7 is the method of any of aspects 1 to 6, wherein the configuration comprises a first indicator associated with the first Tx power setting and a second indicator associated with the second Tx power setting.

Aspect 8 is the method of aspect 7, wherein the first indicator comprises at least one of a power level, a resource block (RB) power assignment, or a resource element (RE) power assignment.

Aspect 9 is the method of either of aspects 7 or 8, wherein the method further comprises receiving a third indicator of a map that correlates each of a plurality of RS resources with each of a plurality of Tx power settings, wherein the first indicator identifies a first RS resource of the plurality of RS resources, and wherein the second indicator identifies a second RS resource of the plurality of RS resources. The map may be a table or a matrix that a wireless device may use to correlate an RS resource with a Tx power setting. The wireless device may receive an indicator of a map, such as an index to a map for the wireless device to use.

Aspect 10 is the method of any of aspects 1 to 9, wherein the method further comprises transmitting a request to measure a transmitted set of RSs associated with a plurality of Tx power settings, wherein the reception of the set of RSs from the network node is based on the request.

Aspect 11 is the method of any of aspects 1 to 10, wherein receiving the configuration comprises receiving a long-term evolution (LTE) positioning protocol (LPP) message comprising the configuration.

Aspect 12 is the method of any of aspects 1 to 11, wherein the set of RSs comprises at least one of a positioning reference signal (PRS), a synchronization signal block (SSB), or a channel state information (CSI) reference signal (CSI-RS).

Aspect 13 is the method of any of aspects 1 to 12, wherein the wireless device comprises at least one of a user equipment (UE) or a positioning reference unit (PRU).

Aspect 14 is the method of any of aspects 1 to 13, wherein the measured set of RSs comprises at least one of (a) a channel impulse response (CIR), (b) a channel frequency response (CFR), (c) a received signal strength indicator (RSSI), (d) a reference signal received power (RSRP), (e) a reference signal received power path (RSRPP), (f) a reference signal received quality (RSRQ), (g) a time of arrival (ToA), (h) a reference signal time difference (RSTD), or (i) an angle of departure (AoD).

Aspect 15 is a method of wireless communication at a network node, wherein the method comprises receiving a configuration for a transmission of a set of reference signals (RSs) associated with a plurality of transmission (Tx) power settings, wherein the set of RSs comprises a first subset of RSs and a second subset of RSs. The method further comprises transmitting the first subset of RSs using a first Tx power setting of the plurality of Tx power settings. The method further comprises transmitting the second subset of RSs using a second Tx power setting of the plurality of Tx power settings.

Aspect 16 is the method of aspect 15, wherein the method further comprises receiving a request for a capability to transmit the first subset of RSs associated with the plurality of Tx power settings. The method further comprises transmitting an indication of the capability associated with the network node to measure the first subset of RSs associated with the first Tx power setting and the second subset of RSs associated with the second Tx power setting.

Aspect 17 is the method of aspect 16, wherein transmitting the indication comprises transmitting a new radio (NR) positioning protocol (NRPP) message comprising the indication.

Aspect 18 is the method of either of aspects 16 or 17, wherein the capability comprises at least one of (a) a number of Tx power settings for the network node to transmit, or (b) a second indication of a second plurality of Tx power settings that the network node supports.

Aspect 19 is the method of any of aspects 15 to 18, wherein the configuration comprises a first indicator associated with the first Tx power setting and a second indicator associated with the second Tx power setting.

Aspect 20 is the method of aspect 19, wherein the first indicator comprises at least one of a power level, a resource block (RB) power assignment, or a resource element (RE) power assignment.

Aspect 21 is the method of any of aspects 15 to 20, wherein receiving the configuration comprises receiving a new radio (NR) positioning protocol (NRPP) message comprising the configuration.

Aspect 22 is the method of any of aspects 15 to 21, wherein the set of RSs comprises at least one of a positioning reference signal (PRS), a synchronization signal block (SSB), or a channel state information (CSI) reference signal (CSI-RS).

Aspect 23 is a method of wireless communication at a network entity, wherein the method comprises transmitting a first configuration for transmitting a set of reference signals (RSs) to a network node, wherein the set of RSs comprises a first subset of RSs and a second subset of RSs, wherein the first subset of RSs is associated with a first Tx power setting and the second subset of RSs is associated with a second Tx power setting, wherein the first Tx power setting is different from the second Tx power setting. The method further comprises transmitting, for a wireless device, a second configuration for a measurement of the set of RSs.

Aspect 24 is the method of aspect 23, wherein the first configuration comprises a first indicator associated with the first Tx power setting and a second indicator associated with the second Tx power setting.

Aspect 25 is the method of aspect 24, wherein the first indicator comprises at least one of a power level, a resource block (RB) power assignment, or a resource element (RE) power assignment.

Aspect 26 is the method of any of aspects 23 to 25, wherein the second configuration comprises a first indicator associated with the first Tx power setting and a second indicator associated with the second Tx power setting.

Aspect 27 is the method of aspect 26, wherein the first indicator comprises at least one of a power level, a resource block (RB) power assignment, or a resource element (RE) power assignment.

Aspect 28 is the method of any of aspects 23 to 27, wherein transmitting the first configuration comprises transmitting a new radio (NR) positioning protocol (NRPP) message comprising the first configuration.

Aspect 29 is the method of any of aspects 23 to 28, wherein transmitting the second configuration comprises transmitting a long-term evolution (LTE) positioning protocol (LPP) message comprising the second configuration.

Aspect 30 is the method of any of aspects 23 to 29, wherein the method further comprises transmitting, to the wireless device, a request for a capability to measure the first subset of RSs associated with the first Tx power setting and the second subset of RSs associated with the second Tx power setting. The method further comprises receiving an indication of the capability associated with the wireless device to measure the first subset of RSs associated with the first Tx power setting and the second subset of RSs associated with the second Tx power setting. The method further comprises configuring the second configuration based on the capability.

Aspect 31 is the method of aspect 30, wherein receiving the indication comprises receiving a long-term evolution (LTE) positioning protocol (LPP) message comprising the indication.

Aspect 32 is the method of either of aspects 30 or 31, wherein the capability comprises at least one of (a) a number of subsets of RSs for the wireless device to measure, (b) a buffering capability, or (c) a measurement gap condition between subsets of the set of RSs.

Aspect 33 is the method of any of aspects 23 to 32, wherein the method further comprises transmitting, to the network node, a request for a capability to transmit the first subset of RSs associated with the first Tx power setting and the second Tx power setting. The method further comprises receiving an indication of the capability associated with the network node to measure the first subset of RSs associated with the first Tx power setting and the second subset of RSs associated with the second Tx power setting. The method further comprises configuring the first configuration based on the capability.

Aspect 34 is the method of aspect 33, wherein receiving the indication comprises receiving a new radio (NR) positioning protocol (NRPP) message comprising the indication. The NRPP message may be part of a transmission reception point (TRP) information exchange procedure. The NRPP message may be exchanged as part of an NRPPa protocol.

Aspect 35 is the method of either of aspects 33 or 34, wherein the capability comprises at least one of (a) a number of Tx power settings for transmission by the network node, or (b) a second indication of a second plurality of Tx power settings that the network node supports.

Aspect 36 is the method of any of aspects 23 to 35, wherein the method further comprises receiving a request to measure a transmitted set of RSs associated with a plurality of Tx power settings, wherein the transmission of the first configuration and the transmission of the second configuration is based on the request.

Aspect 37 is the method of any of aspects 23 to 36, wherein the set of RSs comprises at least one of a positioning reference signal (PRS), a synchronization signal block (SSB), or a channel state information (CSI) reference signal (CSI-RS).

Aspect 38 is the method of any of aspects 23 to 37, wherein the wireless device comprises at least one of a user equipment (UE) or a positioning reference unit (PRU).

Aspect 39 is the method of any of aspects 23 to 38, wherein the network entity comprises a location management function (LMF).

Aspect 40 is an apparatus for wireless communication, including: at least one memory; and at least one processor coupled to the at least one memory and, based at least in part on information stored in the at least one memory, the at least one processor, individually or in any combination, is configured to implement any of aspects 1 to 39.

Aspect 41 is the apparatus of aspect 40, further including at least one of an antenna or a transceiver coupled to the at least one processor.

Aspect 42 is an apparatus for wireless communication including means for implementing any of aspects 1 to 39.

Aspect 43 is a computer-readable medium (e.g., a non-transitory computer-readable medium) storing computer executable code, where the code when executed by at least one processor causes the at least one processor to implement any of aspects 1 to 39.

What is claimed is:

1. An apparatus for wireless communication at a wireless device, comprising:

at least one memory; and at least one processor coupled to the at least one memory and, based at least in part on information stored in the at least one memory, the at least one processor is configured to:

receive a configuration for a measurement of a set of reference signals (RSs) associated with a common transmission reception point (TRP), wherein the set of RSs comprises a first subset of RSs and a second subset of RSs;

receive the set of RSs from the common TRP, wherein the first subset of RSs is associated with a first transmission (Tx) power setting and the second subset of RSs is associated with a second Tx power setting, wherein the first Tx power setting is different from the second Tx power setting;

measure the set of RSs; and output the measured set of RSs for a training of a positioning model, wherein the positioning model generates clean and noisy labels as expected outputs.

2. The apparatus of claim 1, wherein the positioning model is located at the wireless device, wherein, to output the measured set of RSs, the at least one processor is configured to:

train the positioning model based on the measured set of RSs, wherein the trained positioning model generates clean and noisy labels as expected outputs.

3. The apparatus of claim 1, further comprising a transceiver coupled to the at least one processor, wherein, to output the measured set of RSs, the at least one processor is configured to:

transmit, via the transceiver, the measured set of RSs to a training entity for the training of the positioning model.

4. The apparatus of claim 1, wherein the at least one processor is further configured to:

receive a request for a capability to measure the first subset of RSs associated with the first Tx power setting and the second subset of RSs associated with the second Tx power setting; and transmit an indication of the capability associated with the wireless device to measure the first subset of RSs associated with the first Tx power setting and the second subset of RSs associated with the second Tx power setting.

5. The apparatus of claim 4, wherein, to transmit the indication of the capability, the at least one processor is configured to:

transmit a long-term evolution (LTE) positioning protocol (LPP) message comprising the indication of the capability.

6. The apparatus of claim 4, wherein the capability comprises at least one of:

a number of subsets of RSs, associated with the common TRP, for the wireless device to measure;

a buffering capability;

a measurement gap condition between subsets of the set of RSs; or a combination thereof.

7. The apparatus of claim 1, wherein the configuration comprises a first indicator associated with the first Tx power setting and a second indicator associated with the second Tx power setting.

8. The apparatus of claim 7, wherein the first indicator comprises at least one of:

a power level;

a resource block (RB) power assignment;

a resource element (RE) power assignment; or a combination thereof.

9. The apparatus of claim 7, wherein the at least one processor is further configured to:

receive a map that correlates each of a plurality of RS resources of the set of RSs with each of a plurality of Tx power settings, wherein the first indicator identifies a first RS resource of the plurality of RS resources associated with the first subset of RSs, and wherein the second indicator identifies a second RS resource of the plurality of RS resources associated with the second subset of RSs.

10. The apparatus of claim 1, wherein the at least one processor is further configured to:

transmit a request to measure a transmitted set of RSs associated with a plurality of Tx power settings, wherein the reception of the set of RSs from the common TRP is based on the request.

11. The apparatus of claim 1, wherein, to receive the configuration, the at least one processor is configured to:

receive a long-term evolution (LTE) positioning protocol (LPP) message comprising the configuration.

12. The apparatus of claim 1, wherein the set of RSs comprises at least one of:

a positioning reference signal (PRS);

a synchronization signal block (SSB);

a channel state information (CSI) reference signal (CSI-RS) or a combination thereof.

13. The apparatus of claim 1, wherein the wireless device comprises at least one of a user equipment (UE) or a positioning reference unit (PRU).

14. The apparatus of claim 1, wherein the positioning model uses the measured set of RSs to generate the expected outputs, wherein the measured set of RSs comprises at least one of:

a channel impulse response (CIR);

a channel frequency response (CFR);

a received signal strength indicator (RSSI);

a reference signal received power (RSRP);

a reference signal received power path (RSRPP);

a reference signal received quality (RSRQ);

a time of arrival (ToA);

a time of flight (ToF);

a reference signal time difference (RSTD);

an angle of departure (AoD); or a combination thereof.

15. An apparatus for wireless communication at a network entity, comprising:

at least one memory; and at least one processor coupled to the at least one memory and, based at least in part on information stored in the at least one memory, the at least one processor is configured to:

transmit, to a common transmission reception point (TRP) a first configuration for a transmission of a set of reference signals (RSs) from the common TRP, wherein the set of RSs comprises a first subset of RSs and a second subset of RSs, wherein the first subset of RSs is associated with a first Tx power setting and the second subset of RSs is associated with a second Tx power setting, wherein the first Tx power setting is different from the second Tx power setting; and transmit, for a wireless device, a second configuration for a measurement of the set of RSs transmitted from the common TRP for a training of a positioning model, wherein the positioning model generates clean and noisy labels as expected outputs.

16. The apparatus of claim 15, wherein the first configuration comprises a first indicator associated with the first Tx power setting and a second indicator associated with the second Tx power setting.

17. The apparatus of claim 16, wherein the first indicator comprises at least one of:

a power level;

a resource block (RB) power assignment;

a resource element (RE) power assignment; or a combination thereof.

18. The apparatus of claim 15, wherein the second configuration comprises a first indicator associated with the first Tx power setting and a second indicator associated with the second Tx power setting.

19. The apparatus of claim 18, wherein the first indicator comprises at least one of:

a power level;

a resource block (RB) power assignment;

a resource element (RE) power assignment; or a combination thereof.

20. The apparatus of claim 15, wherein, to transmit the first configuration, the at least one processor is configured to:

transmit a new radio (NR) positioning protocol (NRPP) message comprising the first configuration.

21. The apparatus of claim 15, wherein, to transmit the second configuration, the at least one processor is configured to:

transmit a long-term evolution (LTE) positioning protocol (LPP) message comprising the second configuration.

22. The apparatus of claim 15, wherein the at least one processor is further configured to:

transmit, to the wireless device, a request for a capability to measure the first subset of RSs associated with the first Tx power setting and the second subset of RSs associated with the second Tx power setting;

receive an indication of the capability associated with the wireless device to measure the first subset of RSs associated with the first Tx power setting and the second subset of RSs associated with the second Tx power setting; and configure the second configuration based on the capability.

23. The apparatus of claim 22, wherein, to receive the indication, the at least one processor is configured to:

receive a long-term evolution (LTE) positioning protocol (LPP) message comprising the indication.

24. The apparatus of claim 22, wherein the capability comprises at least one of:

a number of subsets of RSs, associated with the common TRP, for the wireless device to measure;

a buffering capability;

a measurement gap condition between subsets of the set of RSs; or a combination thereof.

25. The apparatus of claim 15, wherein the at least one processor is further configured to:

transmit, to the common TRP, a request for a capability to transmit the first subset of RSs associated with the first Tx power setting and the second subset of RSs associated with the second Tx power setting;

receive an indication of the capability associated with the common TRP to measure the first subset of RSs associated with the first Tx power setting and the second subset of RSs associated with the second Tx power setting; and configure the first configuration based on the capability.

26. The apparatus of claim 25, wherein the capability comprises at least one of:

a number of Tx power settings for transmission by the common TRP;

a second indication of a second plurality of Tx power settings supported by the common TRP; or a combination thereof.

27. The apparatus of claim 15, further comprising a transceiver coupled to the at least one processor, wherein the at least one processor is further configured to:

receive, via the transceiver, a request to measure a transmitted set of RSs associated with a plurality of Tx power settings, wherein the transmission of the first configuration and the transmission of the second configuration is based on the request.

28. The apparatus of claim 15, wherein the network entity comprises a location management function (LMF).

29. A method of wireless communication at a wireless device, comprising:

receiving a configuration for a measurement of a set of reference signals (RSs) associated with a common transmission reception point (TRP), wherein the set of RSs comprises a first subset of RSs and a second subset of RSs;

receiving the set of RSs from the common TRP, wherein the first subset of RSs is associated with a first transmission (Tx) power setting and the second subset of RSs is associated with a second Tx power setting, wherein the first Tx power setting is different from the second Tx power setting;

measuring the set of RSs; and outputting the measured set of RSs for training a positioning model, wherein the positioning model generates clean and noisy labels as expected outputs.

30. A method of wireless communication at a network entity, comprising:

transmitting, to a common transmission reception point (TRP) a first configuration for a transmission of a set of reference signals (RSs) from the common TRP, wherein the set of RSs comprises a first subset of RSs and a second subset of RSs, wherein the first subset of RSs is associated with a first Tx power setting and the second subset of RSs is associated with a second Tx power setting, wherein the first Tx power setting is different from the second Tx power setting; and transmitting, for a wireless device, a second configuration for a measurement of the set of RSs transmitted from the common TRP for a training of a positioning model, wherein the positioning model generates clean and noisy labels as expected outputs.

* * * * *